US007722133B2

(12) United States Patent
Suzuki et al.

(10) Patent No.: US 7,722,133 B2
(45) Date of Patent: May 25, 2010

(54) HYDRAULIC BRAKE SYSTEM

(75) Inventors: Masakuni Suzuki, Toyota (JP); Tetsuya Miyazaki, Toyota (JP); Kumiko Akita, Aichi-ken (JP); Takami Iwamoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 232 days.

(21) Appl. No.: 12/057,821

(22) Filed: Mar. 28, 2008

(65) Prior Publication Data

US 2008/0238186 A1  Oct. 2, 2008

(30) Foreign Application Priority Data

Mar. 30, 2007 (JP) .............................. 2007-094729

(51) Int. Cl.
*B60T 8/36* (2006.01)
(52) U.S. Cl. ................... 303/119.2; 303/10; 303/115.4; 303/116.1; 303/116.4
(58) Field of Classification Search ................... 303/10, 303/11, 12, 115.3, 115.4, 115.5, 116.1–116.4, 303/119.1, 119.2
See application file for complete search history.

(56) References Cited

U.S. PATENT DOCUMENTS 4,900,102 A   2/1990  Jonner et al.
4,946,230 A * 8/1990  Sakamoto et al. ........ 303/113.1
6,322,164 B1 * 11/2001 Sakamoto et al. ........ 303/115.4
2006/0181143 A1 * 8/2006 Yamamoto .................... 303/87

FOREIGN PATENT DOCUMENTS

| JP | 2-18150 | 1/1990 |
|---|---|---|
| JP | 5-69806 | 3/1993 |
| JP | 5-116607 | 5/1993 |
| JP | 10-329675 | 12/1998 |
| JP | 2000-95094 | 4/2000 |
| JP | 2003-252189 | 9/2003 |
| JP | 2005-247092 | 9/2005 |
| JP | 2006-347192 | 12/2006 |

* cited by examiner

*Primary Examiner*—Pam Rodriguez
(74) *Attorney, Agent, or Firm*—Oblon, Spivak, McClelland, Maier & Neustadt, L.L.P.

(57) ABSTRACT

A hydraulic brake system for a vehicle includes a brake having a wheel cylinder that applies a braking force to a wheel, and a pressurizing device. The pressurizing device pressurizes the brake liquid and includes a suction portion for sucking a brake liquid, and additionally includes an output portion connected to the wheel cylinder. A linear solenoid valve includes at least one housing, and is connected to the wheel cylinder and to the suction portion of the pressurizing device. The solenoid valve includes a valve portion having a reciprocating valve member and a valve seat opposed to the valve member. A biasing member biases the valve member in one direction and a solenoid applies a drive force to the valve member in an opposite direction. In addition, a hydraulic-pressure-decrease restraining device restrains a decrease of pressure of the brake liquid in the housing.

3 Claims, 16 Drawing Sheets

HYDRAULIC BRAKE SYSTEM

The present application is based on Japanese Patent Application No. 2007-094729 filed on Mar. 30, 2007, the contents of which are incorporated herein by reference.

BACKGROUND OF THE INVENTION

1. Field of the Invention

The present invention relates to a hydraulic brake system and particularly to such a hydraulic brake system in which a hydraulic pressure in a wheel cylinder is increased and decreased by controlling a linear solenoid valve.

2. Discussion of Related Art

For example, Japanese Patent Application Publication No. 2003-252189 discloses a linear solenoid valve including a housing: a poppet valve provided in the housing; a spring that biases the poppet valve in a direction to close the valve; a solenoid that drives, upon supplying thereto of electric power, the poppet valve in a direction to open the valve. This linear solenoid valve is employed by, e.g., a hydraulic-pressure control device of a hydraulic brake system for use in a vehicle, and is used for controlling a hydraulic pressure in a wheel cylinder. In a hydraulic brake system including a linear solenoid valve, a degree of opening of the linear solenoid valve can be adjusted by controlling an electric power supplied to a solenoid of the valve. Therefore, a hydraulic pressure in a wheel cylinder of the hydraulic brake system can be easily controlled.

However, when the hydraulic pressure of the wheel cylinder is increased and decreased in a state in which the linear solenoid valve is opened, self-excited vibration, i.e., a phenomenon that a valve member of the valve continuously vibrates may occur. The more the amount of brake liquid that passes through the linear solenoid valve is, the more likely the self-excited vibration is to occur. The above-indicated Japanese Patent Application Publication proposes to restrain the occurrence of self-excited vibration by pre-charging, before a braking operation is started, the brake liquid into the wheel cylinder and thereby reducing the amount of brake liquid that passes through the linear solenoid valve.

Meanwhile, the self-excited vibration tends to occur more likely if the hydraulic pressure in the housing of the linear solenoid valve is excessively decreased. In particular, in the case where a pressure-decrease linear solenoid valve is communicated with a suction port of a pump via a liquid passage, a hydraulic pressure in a housing of the linear solenoid valve may be excessively decreased when the pump is operated, which leads to causing the self-excited vibration to occur more likely. In addition, it is speculated that if the air dissolved in the brake liquid in the housing separates from the brake liquid to produce air bubbles, the self-excited vibration occurs still more likely. However, the technique disclosed by the above-indicated Japanese Patent Application Publication cannot restrain the self-excited vibration caused for those reasons.

Thus, the conventional hydraulic brake system can be improved with respect to the art of increasing its utility, e.g., the art of restraining the occurrence of self-excited vibration.

SUMMARY OF THE INVENTION

In the above-described background, the present invention has been developed. It is therefore an object of the present invention to solve at least one of the above-identified problems. It is another object of the present invention to provide a hydraulic brake system that enjoys an improved utility.

Hereinafter, some examples of various modes of the present invention that are recognized as being claimable in the present application (hereinafter, referred to as the claimable modes, where appropriate) will be described and explained. The claimable modes include at least respective modes corresponding to the appended claims, but may additionally include broader or narrower modes of the invention or even one or more different inventions than the claimed inventions. Each of the following modes (1) through (14) is numbered like the appended claims, and depends from the other mode or modes, where appropriate, so as to help understand the claimable modes and to indicate and clarify possible combinations of the elements or technical features thereof. It is, however, to be understood that the present invention is not limited to the elements or technical features of the following modes, or the combinations thereof, that will be described below for illustrative purposes only. It is to be further understood that each of the following modes should be construed in view of not only the explanations directly associated therewith but also the detailed description of the preferred embodiments of the invention, and that in additional claimable modes, one or more elements or one or more technical features may be added to, or deleted from, any of the following specific modes.

(1) A hydraulic brake system for a vehicle having a plurality of wheels, comprising:

at least one brake which corresponds to at least one of the wheels and which includes at least one wheel cylinder that is supplied with a brake liquid and applies a braking force corresponding to a pressure of the brake liquid, to said at least one wheel;

a pressurizing device which includes a suction portion for sucking the brake liquid, pressurizes the sucked brake liquid, and additionally includes an output portion that outputs the pressurized brake liquid and is connected to said at least one wheel cylinder such that the output portion can be communicated with said at least one wheel cylinder;

at least one linear solenoid valve which corresponds to said at least one wheel cylinder and which includes (a) at least one housing that is connected to said at least one wheel cylinder via at least one cylinder-side liquid passage, and is connected to the suction portion of the pressurizing device via a pressure-decrease liquid passage, (b) at least one valve portion that includes (b1) at least one valve member that can be reciprocated in opposite directions in an inner space of said at least one housing and (b2) at least one valve seat that is opposed to said at least one valve member and has at least one valve opening through which said at least one cylinder-side liquid passage and the pressure-decrease liquid passage can be communicated with each other and which can be closed by said at least one valve member, (c) at least one biasing member that biases said at least one valve member in one of said opposite directions, and (d) at least one solenoid that applies, to said at least one valve member, a drive force in an other of said opposite directions; and a hydraulic-pressure-decrease restraining device which restrains, when the brake liquid is sucked by the suction portion of the pressurizing device, an amount of decreasing from an atmospheric pressure of a pressure of the brake liquid in said at least one housing.

The hydraulic brake system in accordance with the present invention includes the hydraulic-pressure-decrease restraining device which restrains, when the brake liquid is sucked by the pressurizing device in the state in which the linear solenoid valve is closed, the hydraulic pressure in the housing of the valve from being excessively decreased. Thus, when the hydraulic pressure in the wheel cylinder is decreased, the occurrence of self-excited vibration can be prevented. Thus, the present hydraulic brake system enjoys an improved utility.

The linear solenoid valve changes a degree of communication between the wheel cylinder and the suction portion of the pressurizing device, or allows and inhibits the communication. For example, the linear solenoid valve may be a normally open valve or a normally closed valve. In this case, when the hydraulic pressure of the wheel cylinder is increased or kept, the linear solenoid valve is closed to inhibit the discharging of the pressurized brake liquid from the wheel cylinder and, when the hydraulic pressure of the wheel cylinder is decreased (or when braking is stopped), the linear solenoid valve is opened to allow the discharging of the brake liquid from the wheel cylinder.

In particular, the linear solenoid valve changes a degree of communication in the housing between the cylinder-side liquid passage and the pressure-decrease liquid passage, or allows and inhibits the communication in the housing. More specifically described, the cylinder-side liquid passage, connected to the wheel cylinder, opens in an inner wall of the housing so as to form the valve seat and, when the opening of the valve seat is closed by the valve member, the linear solenoid valve is closed to shut off the communication between the cylinder-side liquid passage and the pressure-decrease liquid passage. In the state in which the linear solenoid valve is closed, a portion of the inner space of the housing that is located on a side of the cylinder-side liquid passage with respect to the opening of the valve seat, is shut off from the pressure-decrease liquid passage, but a portion of the inner space of the housing that is located on a side of the pressure-decrease liquid passage is not shut off from the pressure-decrease liquid passage. That is, the space in which the valve member is provided always communicates with the pressure-decrease liquid passage. In this state, if the pressurizing device sucks the brake liquid so as to decrease the hydraulic pressure of the wheel cylinder, the hydraulic pressure in the portion of the inner space of the housing that is located on the side of the pressure-decrease liquid passage may be excessively decreased, which may lead to causing the self-excited vibration.

However, the present hydraulic brake system includes the hydraulic-pressure-decrease restraining device which restrains, when the pressurizing device sucks the brake liquid in the state in which the linear solenoid valve is closed, the hydraulic pressure in the pressure-decrease-liquid-passage-side portion of the inner space of the housing of the valve from being excessively decreased. Thus, when the hydraulic pressure in the wheel cylinder is decreased, the occurrence of self-excited vibration can be prevented. That is, the present hydraulic brake system enjoys an improved utility.

The hydraulic-pressure-decrease restraining device is for controlling the hydraulic pressure in the pressure-decrease-liquid-passage-side portion of the inner space of the housing of the linear solenoid valve, but not for controlling the hydraulic pressure in the remaining portion of the inner space. Therefore, in the following description, the pressure-decrease-liquid-passage-side portion of the inner space of the housing will be simply referred to as "the inner space of the housing", unless otherwise specified.

The valve member may be provided in the pressure-decrease-liquid-passage-side portion of the inner space of the housing of the linear solenoid valve. More specifically described, a valve-member chamber in which the valve chamber can reciprocate may be provided in the inner space of the housing, and the pressure-decrease liquid passage may be connected to the valve-member chamber such that the communication between the pressure-decrease liquid passage and the valve-member chamber cannot be shut off, and the wheel-cylinder-side liquid passage may be connected to the valve-member chamber such that the communication between the wheel-cylinder-side liquid passage and the valve-member chamber can be shut off by the valve member.

(2) The hydraulic brake system according to the mode (1), further comprising a reservoir which accommodates the brake liquid at the atmospheric pressure; and a liquid-supply passage which connects between the reservoir and the suction portion of the pressurizing device, wherein the hydraulic-pressure-decrease restraining device comprises a suction-resistance changing device which performs at least one of (a) decreasing of a first suction resistance as a resistance exerted to the brake liquid sucked from the liquid-supply passage by the suction portion of the pressurizing device and (b) increasing of a second suction resistance as a resistance exerted to the brake liquid sucked from the pressure-decrease passage by the suction portion of the pressurizing device.

According to this mode, the suction portion of the pressurizing device is connected to the reservoir via the liquid-supply passage. Consequently the pressurizing device sucks a major portion of the brake liquid from the reservoir. On the other hand, the suction portion of the pressurizing device is connected to the pressure-decrease liquid passage. Therefore, the pressurizing device sucks a portion of the brake liquid from the pressure-decrease liquid passage, and accordingly the hydraulic pressure in the inner space of the housing may be excessively decreased.

However, the hydraulic-pressure-decrease restraining device includes the suction-resistance changing device which performs at least one of (a) decreasing of the first suction resistance as the resistance exerted to the brake liquid sucked from the liquid-supply passage and (b) increasing of the second suction resistance as the resistance exerted to the brake liquid sucked from the pressure-decrease liquid passage. Therefore, the second suction resistance is increased relative to the first suction resistance. Consequently the amount of brake liquid sucked from the pressure-decrease liquid passage can be decreased and accordingly the hydraulic pressure in the inner space of the housing can be prevented from being excessively decreased. As will be described later, the manner of increasing of the second suction resistance encompasses a manner in which the communication of the pressure-decrease liquid passage with the pressurizing device is shut off.

(3) The hydraulic brake system according to the mode (2), comprising a hydraulic-pressure control unit including a base body having the pressure-decrease passage, and additionally including said at least one linear solenoid valve and the pressurizing device that are supported by the base body, wherein the reservoir is provided separately from the base body, and wherein the suction-resistance changing device comprises a buffer which is provided in a portion of the liquid-supply passage that is nearer to the suction portion of the pressurizing device than to the reservoir, and which sucks the brake liquid from the reservoir when the pressurizing device does not suck the brake liquid, and discharges the brake liquid when the pressurizing device sucks the brake liquid.

According to this mode, the buffer is provided in the liquid-supply passage, so as to decrease the first suction resistance. That is, since the buffer is provided in the liquid-supply passage, the amount of brake liquid sucked from the pressure-decrease liquid passage can be decreased and accordingly the hydraulic pressure in the inner space of the housing can be prevented from being excessively decreased. The buffer may be one that stores the brake liquid at around an atmospheric pressure. Preferably the buffer is one that has a capacity larger than a total amount of the brake liquid that can be continuously sucked by the pressurizing device for several seconds (e.g., 3 seconds). More preferably the buffer is one that has a capacity larger than a total amount of the brake liquid that can be continuously sucked by the pressurizing device for 10 seconds.

(4) The hydraulic brake system according to the mode (2) or the mode (3), wherein the suction-resistance changing device comprises a flow-passage restricting device which is provided in the pressure-decrease passage, and wherein when the suction portion of the pressurizing device sucks the brake liquid in a state in which said at least one linear solenoid valve is closed, the flow-passage restricting device restricts flow of the brake liquid owing to a decreased area of flow of the pressure-decrease passage and, in a state in which said at least one linear solenoid valve is opened, the flow-passage restricting device does not restrict the flow of the brake liquid.

According to this mode, owing to the decreased area of flow of the pressure-decrease liquid passage, the second suction resistance is increased. However, if the increased second suction resistance is kept all times, it will be difficult to discharge quickly the brake liquid from the wheel cylinder. Hence, in the state in which the linear solenoid valve is opened, the flow-passage restricting device does not restrict the flow of the brake liquid, i.e., cancels the restriction to the flow of the brake liquid, thereby allowing the brake liquid to be discharged at a sufficiently high rate from the wheel cylinder. The flow-passage restricting device may be one that includes one or more of a restrictor, a variable restrictor, a check valve, or a communication switch valve. The manner of decreasing of the flow area of the pressure-decrease liquid passage encompasses a manner in which the communication of the pressure-decrease liquid passage with the pressurizing device is shut off.

(5) The hydraulic brake system according to the mode (4), wherein the flow-passage restricting device comprises a restrictor which is provided in series in the pressure-decrease passage; and a liquid-discharge check valve which is connected to the pressure-decrease passage such that the liquid-discharge check valve is in parallel with the restrictor, and which prevents the brake liquid from flowing backward from the suction portion of the pressurizing device toward said at least one linear solenoid valve, and wherein when a pressure difference across the liquid-discharge check valve exceeds a suction-time pressure difference as a maximum pressure difference across the liquid-discharge check valve at a time when the suction portion of the pressurizing device sucks the brake liquid in a state in which a pressure of the brake liquid present in a portion of the inner space of said at least one housing that is located on a side of the pressure-decrease passage with respect to the valve portion, is equal the atmospheric pressure, the liquid-discharge check valve permits the brake liquid to flow from said at least one linear solenoid valve toward the suction portion of the pressurizing device and, when the pressure difference across the liquid-discharge check valve does not exceed the suction-time pressure difference, the liquid-discharge check valve prevents the brake liquid from flowing from said at least one linear solenoid valve toward the suction portion of the pressurizing device.

According to this mode, the second suction resistance is increased by the restrictor. Consequently the amount of brake liquid sucked from the pressure-decrease liquid passage can be decreased and accordingly the hydraulic pressure in the inner space of the housing (i.e., the pressure-decrease-liquid-passage-side portion of the inner space of the housing) can be prevented from being excessively decreased. However, when the hydraulic pressure in the wheel cylinder is decreased, the restrictor may adversely limit the flow of brake liquid discharged from the wheel cylinder. To avoid this problem, the liquid-discharge check valve is provided. A valve-opening pressure at which the liquid-discharge check valve is opened is pre-set such that the liquid-discharge check valve is not opened even if the pressurizing device may suck the brake liquid in a state in which the hydraulic pressure in the inner space of the housing of the linear solenoid valve is around the atmospheric pressure. Simultaneously, the valve-opening pressure is also pre-set such that the liquid-discharge check valve is opened when the pressurized brake liquid is discharged from the wheel cylinder so as to decrease the hydraulic pressure in the cylinder. Thus, the liquid-discharge check valve not only keeps the increased second suction resistance but also allows the brake liquid to be discharged at the sufficiently high rate from the wheel cylinder. After the liquid-discharge check valve is closed, the hydraulic pressure in the cylinder is decreased owing to the restrictor. Although each of the fifth to eighth modes (5) through (8) generally corresponds to a lower conception (i.e., a more concrete conception) of the mode (4), the each mode (5) through (8) can be directly combined with the mode (2) or the mode (3).

(6) The hydraulic brake system according to the mode (5), wherein the flow-passage restricting device further comprises a liquid-charge check valve which is connected to the pressure-decrease passage such that the liquid-charge check valve is in parallel with the liquid-discharge check valve and the restrictor, and which prevents the brake liquid from flowing backward from said at least one linear solenoid valve toward the suction portion of the pressurizing device, and wherein when the brake liquid is charged, at a pre-set charging pressure, into the liquid-supply passage, the liquid-charge check valve allows the brake liquid to flow from the suction portion toward said at least one linear solenoid valve.

According to this mode, the liquid-charge check valve is provided. Therefore, when a new vehicle is assembled or when a vehicle is subjected to maintenance, the brake liquid can be easily charged into the present brake system through the reservoir.

(7) The hydraulic brake system according to any of the modes (4) through (6), wherein the flow-passage restricting device comprises a communication switch valve which selectively switches the pressure-decrease passage to a communication state thereof and to a shut-off state thereof.

According to this mode, the communication switch valve can shut off the communication of the pressure-decrease liquid passage with the suction portion of the pressurizing device. In this state, no brake liquid is sucked from the inner space of the housing and accordingly the hydraulic pressure in the inner space of the housing can be prevented from being decreased. On the other hand, when the brake liquid is discharged from the wheel cylinder, the communication switch valve can allow the communication of the pressure-decrease liquid passage with the suction portion of the pressurizing device. Although the communication switch valve may be either a normally open valve or a normally closed valve, it is not preferred that the valve be a linear solenoid valve. In other words, it is preferred that the communication switch valve be one wherein when the valve is opened, a valve member thereof is moved to a position where the valve member is held in contact with an inner wall of the housing that is opposite to the valve seat. Since, in the state in which the communication switch valve is opened, the valve member is held in contact with the inner wall of the housing, the self-excited vibration can be prevented from occurring to the communication switch valve.

(8) The hydraulic brake system according to the mode (7), wherein the flow-passage restricting device further comprises a communication-switch-valve control portion which controls the communication switch valve such that when the pressurizing device sucks the brake liquid, the communication switch device is placed in the shut-off state thereof and, when said at least one linear solenoid valve is opened, the communication switch device is placed in the communication state thereof.

According to this mode, the flow-passage restricting device further includes the communication-switch-valve control portion. The communication-switch-valve control portion may be constituted by a computer that implements a communication-switch-valve control program, or an electric circuit including an electromagnetic switch (e.g., a relay, a transistor, or a MOS-FET) that is operated based on a control signal supplied to the pressurizing device or the linear solenoid valve.

(9) The hydraulic brake system according to any of the modes (1) through (8), wherein the pressurizing device comprises a pump which pressurizes the brake liquid; an electric motor which drives the pump; and an accumulator which stores the brake liquid pressurized by the pump, wherein the hydraulic brake system further comprises a pump control device which controls the electric motor so as to keep a hydraulic pressure in the accumulator within a pre-set pressure range, and wherein the hydraulic-pressure-decrease restraining device comprises a rotation-speed limiting portion which limits a rotation speed of the electric motor to a speed not higher than a speed assuring that occurrence of a self-excited vibration that said at least one valve member resonates in said opposite directions in said at least one housing is prevented.

According to this mode, the rotation speed of the electric motor is decreased to lower a suction or negative pressure of the pump. Thus, the hydraulic pressure in the inner space of the housing can be prevented from being excessively decreased. The rotation speed assuring that the occurrence of self-excited vibration is prevented, can be determined, in advance, by conducting an experiment. The decreasing of rotation speed of the electric motor may be done by decreasing, using, e.g., an inverter, the electric power supplied to the motor, or by stopping intermittently the supplying of electric power to the motor, as will be described later. The hydraulic-pressure-decrease restraining device may be a portion of the pump control device, or a device independent of the pump control device.

(10) The hydraulic brake system according to the mode (9), further comprising an electric-power supply device which supplies an electric power to the electric motor, wherein the rotation-speed limiting portion comprises an intermittent-stop commanding portion which commands the electric-power supply device to intermittently stop supplying of the electric power to the electric motor.

According to this mode, the rotation speed of the electric motor can be decreased considerably easily. More specifically described, this mode does not need a device (e.g., an inverter) that controls the electric power. Since an electric-power source or a device that can supply electric power at a pre-set voltage suffices, the production cost of the hydraulic brake system can be reduced. Intermittently stopping the supplying of electric power to the electric motor means intermittently supplying the electric power to the electric motor.

The rotation speed of the electric motor can be limited to the speed not higher than the speed assuring that the occurrence of self-excited vibration is prevented, in such a manner that a rotation-speed detector that detects the rotation speed of the motor is employed. However, even if the rotation-speed detector may not be employed, the occurrence of self-excited vibration can be prevented by determining a first time duration in which electric power is supplied to the electric motor, and a second time duration in which the supplying of electric power to the motor is stopped. In the latter case, it is difficult to obtain an accurate rotation speed of the motor. However, if the occurrence of self-excited vibration is prevented as a fact, then it can be said that the rotation speed of the electric motor is limited to the speed not higher than the speed assuring that the occurrence of self-excited vibration is prevented.

(11) The hydraulic brake system according to the mode (9) or the mode (10), wherein the hydraulic-pressure-decrease restraining device further comprises a rotation-speed-limitation canceling portion which cancels, when the hydraulic pressure of the accumulator is not higher than a pre-set threshold pressure higher than a lower limit of the pre-set pressure range, limitation of the rotation-speed limiting portion to the rotation speed of the electric motor.

If the rotation speed of the electric motor is limited, the hydraulic pressure of the accumulator may be decreased to below the lower limit of the pre-set pressure range. However, according to this mode, when the hydraulic pressure of the accumulator becomes not higher than the pre-set threshold pressure higher than the lower limit of the pre-set pressure range, the limitation to the rotation speed of the motor is canceled to increase quickly the hydraulic pressure of the accumulator or decrease the rate of decrease of the accumulator's pressure. Thus, the above-indicated problem can be avoided.

Usually, the operation of the pump is started when the hydraulic pressure of the accumulator becomes not higher than a lower-side threshold pressure higher than the lower limit of the pre-set pressure range, and is stopped when the accumulator's pressure becomes not lower than an upper-side threshold pressure lower than the upper limit of the pre-set pressure range. The threshold pressure recited in this mode may correspond to the above-described lower-side threshold pressure. That is, the threshold pressure recited in this mode may be selected at a pressure at which the operation of the pump is started on the assumption that the rotation speed of the electric motor is not limited.

The pump control device may be adapted to control the pump in such manner that when the accumulator's pressure becomes not higher than a first threshold pressure falling in the pre-set pressure range, and the rotation-speed-limitation canceling portion cancels, when the accumulator's pressure becomes not higher than a second pre-set threshold pressure lower than the first threshold pressure higher than the lower limit of the pre-set pressure range, the limitation to the rotation speed of the electric motor. In this case, the threshold pressure recited in this mode corresponds to the above-described second threshold pressure. Therefore, the rotation-speed limiting portion limits the rotation speed of the electric motor, only when the accumulator's pressure is higher than the second pre-set threshold pressure.

(12) The hydraulic brake system according to any of the modes (9) through (11), wherein the hydraulic-pressure-decrease restraining device further comprises a self-excited-vibration prevention judging portion which carries out a plurality of pressure-change detecting operations in each of which, when said at least one linear solenoid valve is opened and the brake liquid is discharged from said at least one wheel cylinder in a state in which said at least one wheel cylinder is charged with the pressurized brake liquid and the rotation speed of the electric motor is kept at a corresponding one of a plurality of pre-set rotation speeds, changes of a hydraulic pressure in said at least one wheel cylinder are detected, wherein the self-excited-vibration prevention judging portion judges, based on the changes of the hydraulic pressure in said at least one wheel cylinder detected in said each of the pressure-change detecting operations, whether said one of the pre-set rotation speeds is said speed assuring that the occurrence of the self-excited vibration is prevented, and wherein the rotation-speed limiting portion limits the rotation speed of the electric motor to a speed not higher than a pre-set rotation speed selected from at least one pre-set rotation speed of said plurality of pre-set rotation speeds, said at least one pre-set rotation speed having been judged, by the self-excited-vibration prevention judging portion, as said speed assuring that the occurrence of the self-excited vibration is prevented.

According to this mode, the hydraulic pressure in the inner space of the housing is intentionally decreased to some extent by operating the pump and, in this state, the brake liquid pressurized and charged into the wheel cylinder is discharged, i.e., the hydraulic pressure in the wheel cylinder is decreased, so as to judge whether the self-excited vibration occurs to the linear solenoid valve. As will be described in detail in connection with the preferred embodiments of the present invention, if the self-excited vibration occurs to the linear solenoid valve, for example, when the hydraulic pressure in the wheel cylinder is decreased, the cylinder's pressure is decreased while vibrating. Therefore, based on this pressure change, the self-excited-vibration prevention judging portion can judge whether the self-excited vibration has occurred to the linear solenoid valve. Thus, according to this mode, when a new vehicle is assembled or when a vehicle is subjected to maintenance, it is possible to inspect at how decreased rotation speed of the electric motor the occurrence of self-excited vibration can be effectively restrained. The pre-set rotation speed selected from at least one of the pre-set rotation speeds may be the highest rotation speed or the second highest rotation speed of all the pre-set rotation speeds that have been judged as the assuring speed.

(13) The hydraulic brake system according to any of the modes (9) through (12), wherein the rotation-speed limiting portion comprises a braking-related rotation-speed limiting portion which limits, when the vehicle is braked and when the hydraulic pressure of the accumulator is higher than a pre-set threshold pressure higher than a lower limit of the pre-set pressure range, the rotation speed of the electric motor to a speed not higher than a braking-related pre-set speed lower than said speed assuring that the occurrence of the self-excited vibration is prevented.

When the vehicle is braked, the hydraulic pressure in the wheel cylinder is increased; and when the braking is stopped, the linear solenoid valve is opened to decrease the hydraulic pressure in the wheel cylinder. That is, the braking is followed by the decreasing of the cylinder's pressure where the self-excited vibration may occur. Therefore, if the rotation speed of the electric motor is decreased during braking, then the hydraulic pressure in the inner space of the housing can be effectively prevented from being excessively decreased immediately before the cylinder's pressure is decreased. Whether the vehicle is being braked or not may be judged by judging whether a brake pedal is being depressed by a driving person, or whether the hydraulic pressure in the wheel cylinder is higher than a reference pressure. It can be said that a time duration in which the vehicle is braked contains a time duration in which the cylinder's pressure is decreased. The threshold pressure recited in this mode may be equal to the threshold pressure (i.e., the above-described second threshold pressure) recited in the mode (11). The braking-related pre-set rotation speed recited in this mode may be zero. That is, when the vehicle is braked, the operation of the pump may be inhibited.

(14) The hydraulic brake system according to any of the modes (1) through (13), wherein said at least one biasing member comprises at least one spring.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Hereinafter, there will be described preferred embodiments of the present invention by reference to the drawings.

Figure 1:
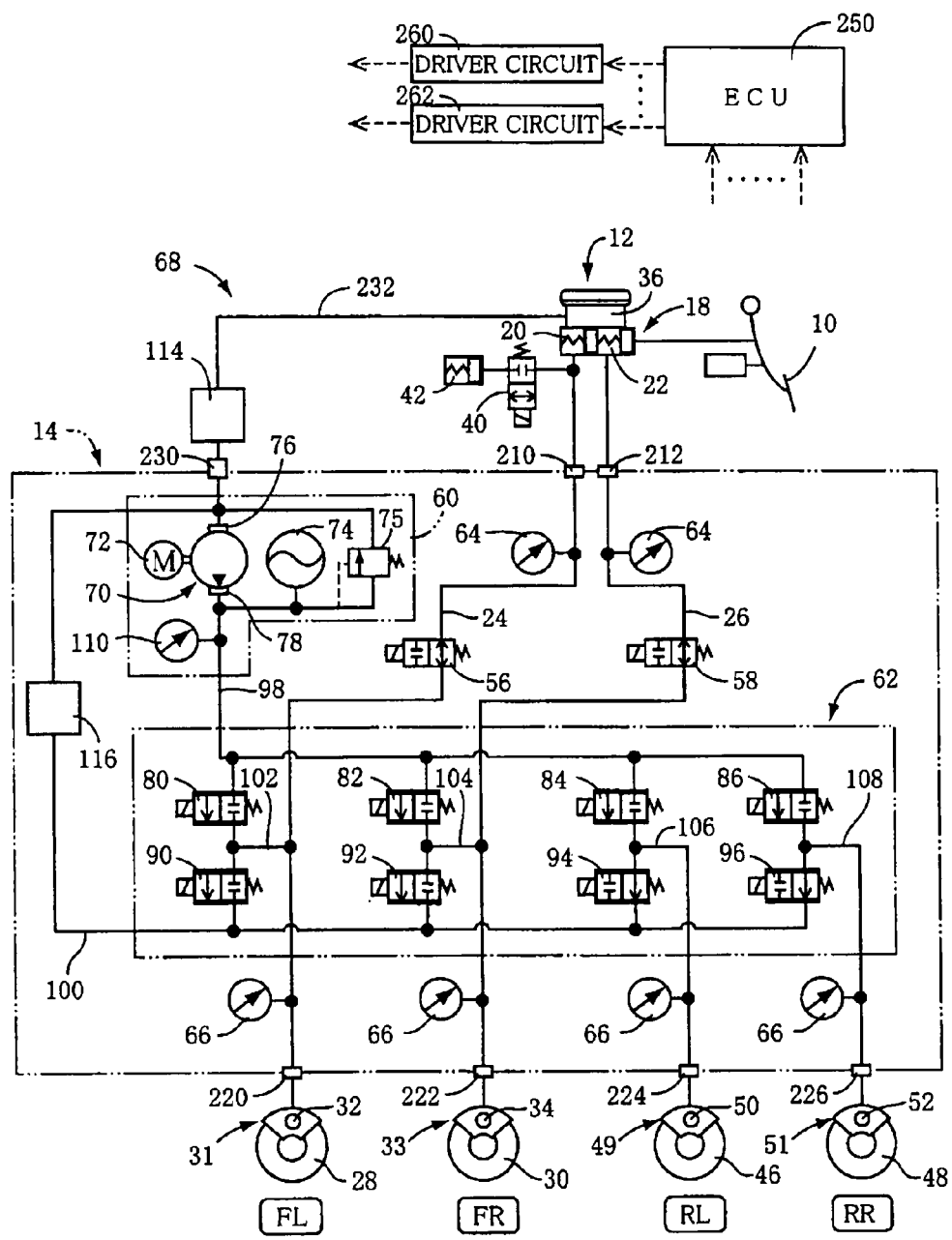
FIG. 1 is a diagrammatic view of a hydraulic brake system to which the present invention is applied.

FIG. 1 schematically shows a hydraulic brake system for an automotive vehicle, to which the present invention is applied. The present hydraulic brake system includes hydraulic-pressure-control linear solenoid valves. In addition, the hydraulic brake system includes a brake pedal 10 as a brake operating member; a master-cylinder device 12; and a brake actuator 14.

The master-cylinder device 12 includes a master cylinder 18 that pressurizes a brake fluid or liquid in response to operation or depression of the brake pedal 10 by a driver (i.e., a driving person). In the present embodiment, the master cylinder 18 has two pressure chambers 20, 22 that are connected, via respective liquid passages 24, 26, to respective wheel cylinders 32, 34 of two brakes 31, 33 that are adapted to brake respective rotations of a left front wheel 28 and a right front wheel 30. The master-cylinder device 12 additionally includes a reservoir 36 that stores the brake liquid at an atmospheric pressure and supplies the brake liquid to each of the two pressure chambers 20, 22 of the master cylinder 18. When the brake pedal 10 is depressed by the driver, the two pressure chambers 20, 22 are shut off from the reservoir 36, and the respective brake liquids pressurized in the two pressure chambers 20, 22 are supplied to the two wheel cylinders 32, 34. A stroke simulator 42 is connected via a solenoid-operated open-close valve 40 to one 20 of the two pressure chambers 20, 22.

Next, there will be described the brake actuator 14 as a hydraulic-pressure control unit.

The brake actuator 14 controls respective hydraulic pressures in not only the above-described wheel cylinders 32, 34 but also respective wheel cylinders 50, 52 of two brakes 49, 51 that are adapted to brake respective rotations of a left rear wheel 46 and a right rear wheel 48. As shown in FIG. 1, the brake actuator 14 includes two master-cut valves 56, 58; a power-operated hydraulic-pressure source 60 as a pressurizing device; a hydraulic-pressure-control valve device 62; two master-cylinder-pressure sensors 64; and four wheel-cylinder-pressure sensors 66. Those constituent elements of the brake actuator 14 are assembled into a block-like base body (FIG. 3), described later, so as to provide a single unit.

The power-operated hydraulic-pressure source 60 includes a pump 70 that pumps up the brake liquid from the reservoir 36 via a reservoir-communication passage 68 as a liquid supply passage; an electric motor 72 that drives the pump 70; an accumulator 74 that accommodates the pressurized brake liquid outputted from the pump 70; and a relief valve 75 that controls the pressure of the brake liquid outputted from the pump 70, to a pressure not higher than a reference pressure. The pump 70 is a plunger pump, and has a suction port 76 as a suction portion and an output port 78 as an output portion. The suction port 76 is connected to the reservoir-communication passage 68. However, the pump 70 may be provided by a gear pump.

The power-operated hydraulic-pressure source 60 is connected via the hydraulic-pressure-control valve device 62 to each of the four wheel cylinders 32, 34, 50, 52. The hydraulic-pressure-control valve device 62 includes four pressure-increase solenoid-operated hydraulic-pressure-control valves (hereinafter, simply referred to as the "pressure-increase valves") 80, 82, 84, 86 that control the flowing of the brake liquid from at least one of the pump 70 and the accumulator 74 into the corresponding wheel cylinders 32, 34, 50, 52; and four pressure-decrease solenoid-operated hydraulic-pressure-control valves (hereinafter, simply referred to as the "pressure-decrease valves") 90, 92, 94, 96 that control the flowing of the brake liquid from the corresponding wheel cylinders 32, 34, 50, 52 into the reservoir 36. The pump 70 and the accumulator 74 are connected to the pressure-increase valves 80, 82, 84, 86 via a pressure-increase passage 98; and the pressure-decrease valves 90, 92, 94, 96 are connected to the reservoir 36 via a pressure-decrease passage 100 as a pressure-decrease liquid passage. Thus, the four wheel cylinders 32, 34, 50, 52 are provided with the respective pressure-increase valves 80, 82, 84, 86 and the respective pressure-decrease valves 90, 92, 94, 96, independent of each other, so that the respective hydraulic pressures in the four wheel cylinders 32, 34, 50, 62 can be controlled independent of each other. The four pairs of pressure-increase and pressure-decrease valves (80, 90), (82, 92), (84, 94), (86, 96) are connected to the four wheel cylinders 32, 34, 50, 62 via respective wheel-cylinder passages 102, 104, 106, 108 each as a cylinder-side liquid passage.

Between the pump 70 and the pressure-increase valves 80, 82, 84, 86, there is provided a hydraulic-pressure-source hydraulic-pressure sensor 110 that detects a hydraulic pressure in the power-operated hydraulic-pressure source 60. The four wheel-cylinder passages 102, 104, 106, 108 are provided with respective wheel-cylinder hydraulic-pressure sensors 66 that detect respective hydraulic pressures in the four wheel cylinders 32, 34, 50, 52. Each of the above-described two master cut valves 56, 58 is provided between a corresponding one of the two pressure chambers 20, 22 of the master cylinder 18 and a corresponding one of the two wheel cylinders 32, 34; and each of the above-described two master-cylinder pressure sensors 64 is provided between a corresponding one of the two master cut valves 56, 58 and a corresponding one of the two pressure chambers 20, 22 of the master cylinder 18, so that the each master-cylinder pressure sensor 64 may detect a hydraulic pressure in the corresponding pressure chamber 20, 22.

The reservoir-communication passage 68 is provided with a buffer 114 that temporarily accommodates the brake liquid. The buffer 114 is distant from the reservoir 36, and is connected to the reservoir-communication passage 68 at a position nearer to the brake actuator 14 than to the reservoir 36. The pressure-decrease passage 100 is provided with a restrictor-valve device 116 that increases resistance to the flowing of the brake liquid through the passage 100. The buffer 114 and the restrictor-valve device 116 will be described in detail, later.

The pressure-increase valves 80-86 and the pressure-decrease valves 90-96 are all linear solenoid valves. Each of the linear solenoid valves 80-86, 90-96 has a predetermined relationship between valve-opening pressure and electric current supplied thereto. The valve-opening pressure is a difference between a hydraulic pressure on an upstream side of each linear solenoid valve 80-86, 90-96 and a hydraulic pressure on a downstream side of the same 80-86, 90-96 when the same 80-86, 90-96 is opened. Therefore, the valve-opening pressure of each linear solenoid valve 80-86, 90-96 can be changed by increasing or decreasing the electric current supplied thereto. Thus, the hydraulic pressure in each of the wheel cylinders 32, 34, 50, 52 (hereinafter, simply referred to as the "wheel-cylinder pressure" or the "cylinder pressure", if appropriate) can be continuously changed by controlling the electric current supplied to a corresponding one of the pressure-increase valves 80-86 and/or a corresponding one of the pressure-decrease valves 90-96. That is, each cylinder pressure can be easily controlled to a desirable value.

In the present hydraulic brake system, the four pressure-increase valves 80-86 are all normally-closed valves; the two pressure-decrease valves 90, 92 corresponding to the two front wheels 28, 30 are normally-closed valves; and the two pressure-decrease valves 94, 96 corresponding to the two rear wheels 32, 34 are normally-open valves. In the present embodiment, each of the four pressure-decrease valves 90,

92, 94, 96 corresponds to a linear solenoid valve employed by the hydraulic brake system in accordance with the present invention.

Figure 2:
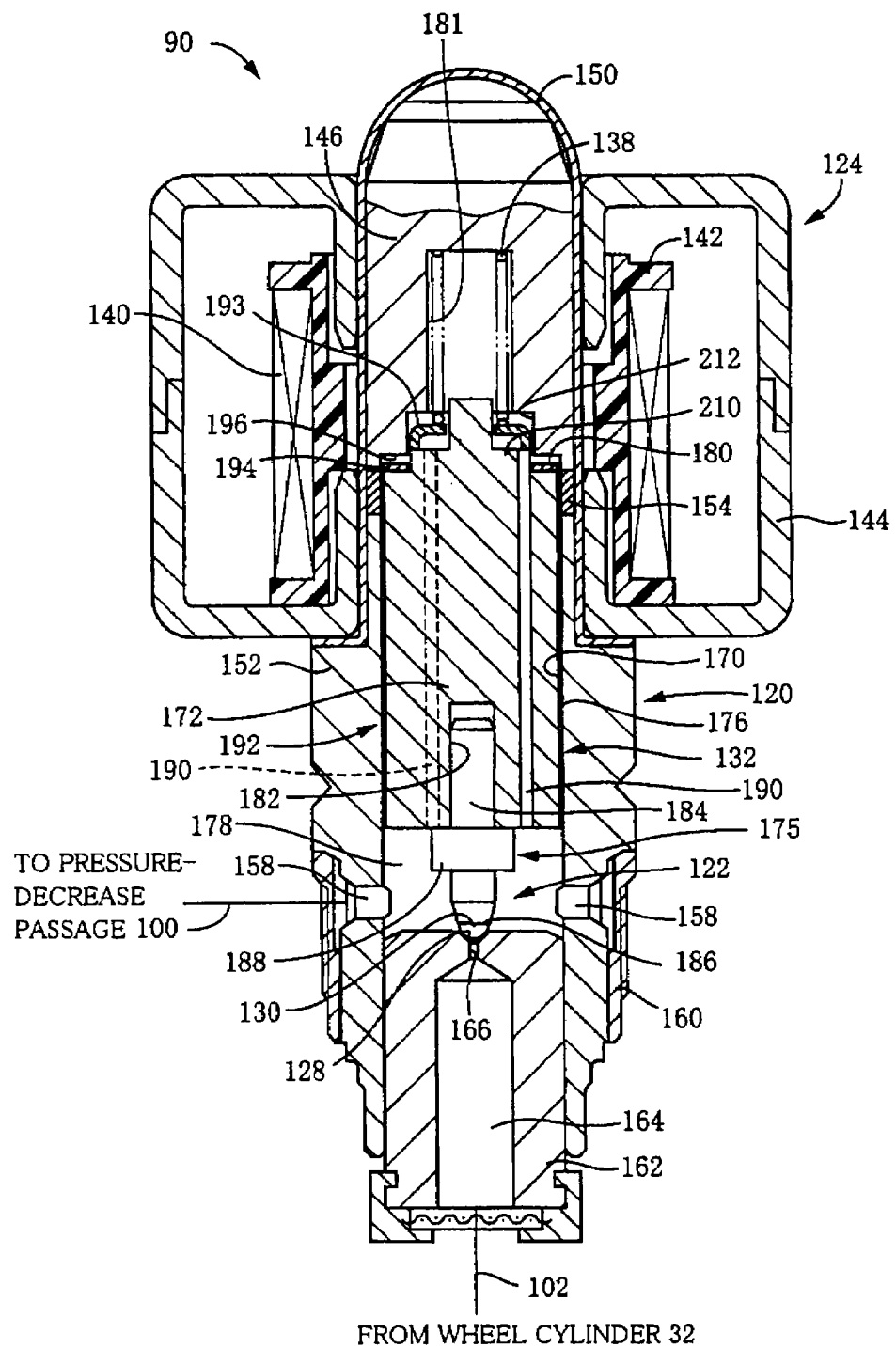
FIG. 2 is a front cross-sectional view of a linear solenoid valve employed by the hydraulic brake system.

As shown in FIG. 2, the pressure-decrease valve 90 includes a valve housing 120; a seat-valve portion 122; and a solenoid 124 as an electromagnetic-drive-force producing device. The seat-valve portion 122 includes a valve seat 128 having a tapered inner surface; a ball 130; a plunger 132 holding or supporting the ball 130; and a spring 138 as an elastic or biasing member that biases the plunger 132 in a direction to move the ball 130 toward the valve seat 128. The solenoid 124 includes a solenoid coil 140; a resin-based holding member 142 holding the solenoid coil 140; a first magnetic-path forming member 144; and a second magnetic-path forming member 146. Each of the first and second magnetic-path forming members 144, 146 is formed of a ferromagnetic material.

In the present embodiment, the valve housing 120 (hereinafter, simply referred to as the "housing 120", if appropriate) is constituted by a plurality of members that are integrally assembled with each other. Those members include a first member 150 and a second member 152 that are joined to each other such that the two members 150, 152 are coaxial with each other. The first member 150 is formed of a non-magnetic material and has a cylindrical shape with a thin bottom wall. The second magnetic-path forming member 146 is entirely fitted and accommodated in the first member 150, so that the member 146 is coaxial with the second member 152. The second member 162 is formed of a ferromagnetic material and has a hollow cylindrical shape. One axial-direction end of the second member 152 is fitted in the first member 150 such that a spacer 154 formed of a non-magnetic material is provided between the one end of the second member 152 and the second magnetic-path forming member 146. The first magnetic-path forming member 144 is fitted on an outer surface of the first member 150 such that the member 144 surrounds the solenoid coil 140.

The cylindrical wall of the second member 152 has two first ports 158 that are connected via the pressure-decrease passage 100 to the suction port 76 of the pump 72. The second member 152 supports an attachment member 160 for attaching the pressure-decrease valve 90 to another member. The attachment member 160 has an opening, not shown, that allows the brake liquid to flow from the pressure-decrease valve 90 to the pressure-decrease passage 100.

The housing 120 includes a third member 162 that is joined to the other axial-direction end of the second member 152. The third member 162 has a through-hole that is formed therethrough in an axial direction thereof and that defines a second port 164 connected to the wheel-cylinder passage 102. The second port 164 is connected via the wheel-cylinder passage 102 to the wheel cylinder 32 of the front left wheel 28. The second port 164 has an open end 166 as a valve opening that is provided on the side of the first ports 158 and that communicates with the valve seat 128.

The second and third members 152, 162 and the second magnetic-path forming member 146 cooperate with each other to define a generally cylindrical plunger chamber 170 in which the above-described plunger 132 is fitted such that the plunger 132 can be reciprocated in its axial directions that are opposite to each other. The plunger 132 includes a main body 172 that has a circular transverse cross section and that is fitted in the plunger chamber 170 such that a small clearance 176 is left between an outer circumferential surface of the main body 172 and an inner circumferential surface of the second member 152 that defines the plunger chamber 170. Thus, in the plunger chamber 170, a valve chamber 178 is provided on the side of the valve seat 128, and a space 180 is provided on the side of the second magnetic-path forming member 146 or the solenoid 124.

The above-described spring 138 is provided in a spring chamber 181 as a portion of the plunger chamber 170 that is located between the plunger 132 and the second magnetic-path forming member 146. The spring 138 biases the plunger 132 in a direction to cause the ball 130 to be seated on the valve seat 128.

In the present embodiment, the plunger 132 and the ball 130 cooperate with each other to constitute a valve member of the pressure-decrease valve 90. In addition, the plunger chamber 170 including the valve chamber 178, the space 180, and the spring chamber 181 corresponds to a valve-member chamber of the pressure-decrease valve 90 that is located on the side of the pressure-decrease passage 100 with respect to the valve seat 128.

The plunger 132 includes, in addition to the main body 172 that is formed of a ferromagnetic material, a ball holding member 175 that is fixed to one end portion of the main body 172 and that holds the ball 130.

The one end portion of the main body 172 has a fitting hole 182 that is coaxial with the plunger 132, and a fitting axial portion 184 of the ball holding member 175 is press-fitted in the fitting hole 182. The ball holding member 175 additionally has a holding axial portion 186 that projects toward the valve seat 128 and that holds the ball 130 such that the ball 130 is located on the axis line of the plunger 132. Moreover, the ball holding member 175 has, as an intermediate portion thereof a large-diameter portion 188 whose diameter is larger than that of the fitting axial portion 184 and which is held in butting contact with an end surface of the main body 172. Thus, the position of the ball 130 in the plunger 132 with respect to its axial direction is defined.

The main body 172 of the plunger 132 has a plurality of through-holes 190 (in the present embodiment, three through-holes 190; only two through-holes 190 are shown in FIG. 2) that are formed therethrough in its axial direction. The three through-holes 190 are located on a circle whose center rides on the axis line of the main body 172, and are distant from each other in a circumferential direction of the circle. The through-holes 190 and the above-described clearance 176 cooperate with each other to define a communication passage 192 assuring that the valve chamber 178 and the space 180 communicate with each other, i.e., assuring that the brake liquid flows between the valve chamber 178 and the space 180. An end surface of the main body 172 of the plunger 132 that is located on the side of the spring 138 is provided with a support member 193 that supports the spring 138.

The space 180 accommodates the brake liquid. A limit of movement of the plunger 132 toward the second magnetic-path forming member 146 is defined by butting of a shoulder surface of the plunger 132 on a butting surface (or an attracting surface) 196 as a butting portion of the second magnetic-path forming member 146. The shoulder surface of the plunger 132 is provided with a thin plate 194 formed of a non-magnetic material. The thin plate 194 provides an appropriate distance between the shoulder surface and the attracting surface 196, and prevents the plunger 132 magnetically attracted by the attracting surface 196, from being permanently fixed to the same 196, i.e., assures that the plunger 132 is easily separated from the attracting surface 196.

The normally-closed pressure-decrease valve 92 has the same construction as the above-described construction of the normally-closed pressure-decrease valve 90.

Each of the two normally-open pressure-decrease valves 94, 96 has, e.g., the same construction as that of a pressure-decrease valve disclosed by Japanese Patent Application Publication No. 2000-95094, and is not described any more here. In addition, each of the normally-closed pressure-increase valves 80, 82, 84, 86 has the same construction as that of the normally-closed pressure-decrease valve 90, except that the first ports 158 of the each pressure-increase valve 80, 82, 84, 86 are connected via a corresponding one of the wheel-cylinder passages 102, 104, 106, 108 to a corresponding one of the wheel cylinders 32, 34, 60, 52, and the second port 164 of the each pressure-increase valve 80, 82, 84, 86 is connected via the pressure-increase passage 98 to the power-operated hydraulic-pressure source 60.

Figure 3:
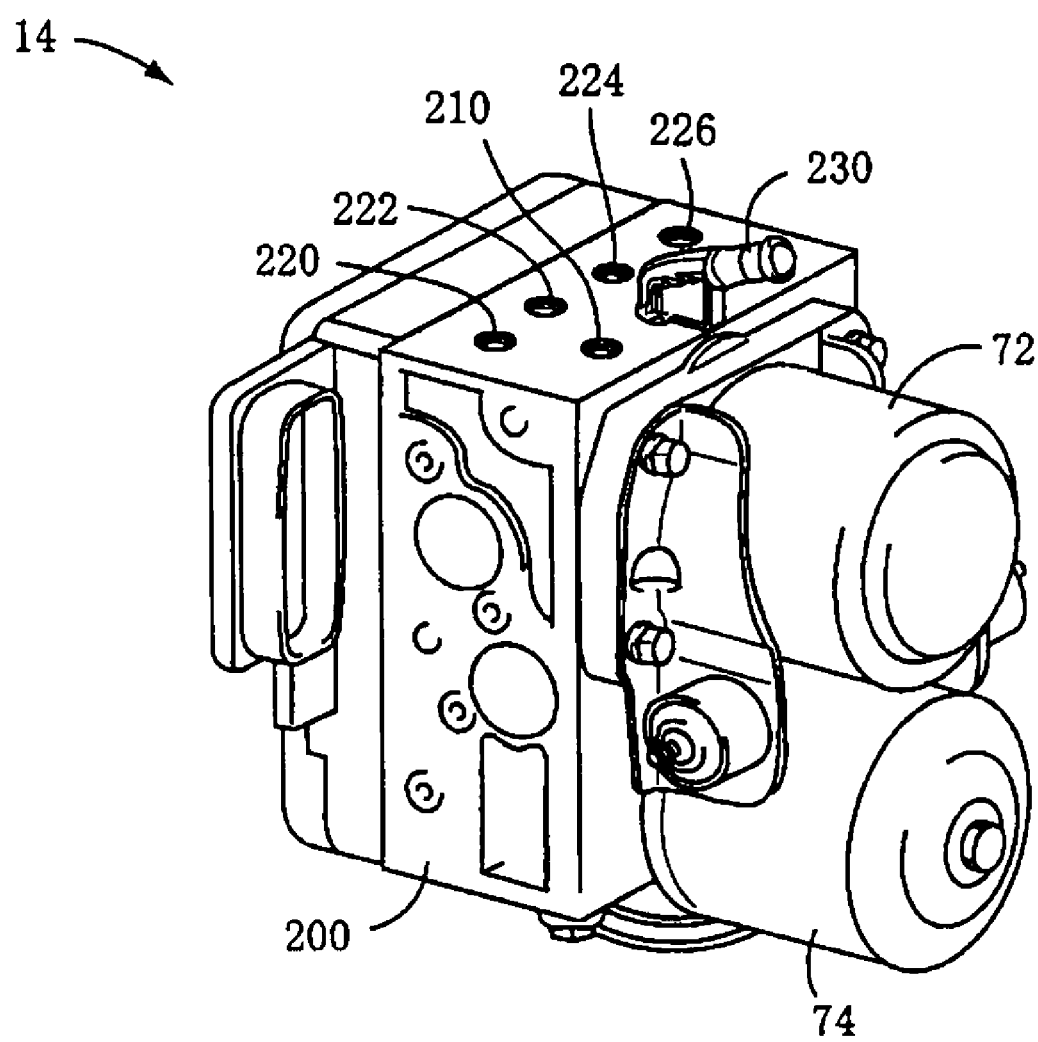
FIG. 3 is a perspective view of a brake actuator employed by the hydraulic brake system.

FIG. 3 shows an external appearance of the brake actuator unit 14. In the present embodiment, the power-operated hydraulic-pressure source 60, the hydraulic-pressure-control valve device 62, etc. are assembled into a unit, i.e., an integral block 200 as a base body. The block 200 has various liquid passages including the pressure-increase passage 98 and the pressure-decrease passage 100, and the solenoid-operated hydraulic-pressure control valves 80-86, 90-96 and the pump 70 are connected to each other via those liquid passages. The power operated hydraulic-pressure source 60, the hydraulic-pressure-control valve device 62, etc. that are employed by the brake actuator unit 14 cooperate with each other to control the respective hydraulic pressures in the wheel cylinders 32, 34, 50, 52. Thus, the present hydraulic brake system is operated.

As shown in FIG. 1, the brake actuator 14 has two ports 210, 212 (only one port 210 is shown in FIG. 2) that are connected to the two pressure chambers 20, 22 of the master cylinder 12, respectively. In addition, the brake actuator 14 has four ports 220, 222, 224, 226 that are connected to the four wheel cylinders 32, 34, 50, 52, respectively. Moreover, the brake actuator 14 has a reservoir-connection port 230 that is connected to the reservoir 36 via a reservoir hose 232.

The present hydraulic brake system is controlled by an electronic control unit (ECU) 250 shown in FIG. 1. The ECU 250 includes a control portion, not shown, that employs a computer and an input-and-output (I/O) portion. The computer includes a central processing unit (CPU), a memory (e.g., a read only memory (ROM), a random access memory (RAM), a flash memory, etc.), and a bus for connecting the CPU and the memory to each other. The I/O portion includes an input portion to which various sensors such as the master-cylinder pressure sensors 64 are connected, and additionally includes an output portion which is connected to a plurality of driver circuits 260, 262 to which the electric motor 72 that drives the pump 70 of the power-operated hydraulic-pressure source 60, the respective solenoids 124 of the pressure-increase valves 80-86 and the pressure-decrease valves 90-96, etc. are connected.

The memory of the computer stores various control programs, not shown, such as a main routine or a hydraulic-pressure control routine, according to which a current state of the vehicle is obtained based on results detected by various sensors and an electric braking control is carried out based on the obtained vehicle's state.

When the present hydraulic brake system carries out any sort of control, such as the electric braking control that needs the operation of the brake actuator 14, the ECU 260 determines respective target hydraulic pressures for the four wheel cylinders 32, 34, 50, 52, determines respective electric currents to be supplied to the respective solenoids 124 of the pressure-increase and pressure-decrease valves 80-86, 90-96, so as to reach the corresponding determined target hydraulic pressures, and controls the supplying of the determined electric currents to the solenoids 124. The determined electric currents are supplied to the hydraulic-pressure-control valve device 62, so that the respective hydraulic pressures in the four wheel cylinders 32, 34, 50, 52 are controlled to the corresponding target hydraulic pressures, i.e., that the four brakes 31, 33, 49, 51 are operated as intended. Under this control, the master-cut valves 56, 58 are kept closed. In the case where the wheel-cylinder pressures are electrically controlled in response to the depression of the brake pedal 10, the solenoid-operated open-close valve 40 is opened and the brake liquid is discharged from the pressure chamber 20 into the stroke simulator 42, so that the driver can feel a reaction corresponding to his or her depressing force.

As described above, each of the four pressure-increase valves 80-86 and the two pressure-decrease valves 90, 92 is a normally-closed valve wherein, upon supplying of an electric current to the solenoid 124 thereof, the each valve 80-86, 90, 92 is opened to control the hydraulic pressure in the corresponding wheel cylinder 32, 34, 50, 52. Each of the two pressure-decrease valves 94, 96 is a normally-open valve wherein, upon supplying of an electric current to the solenoid 124 thereof, the each valve 94, 96 is closed to control the hydraulic pressure in the corresponding wheel cylinder 50, 52.

Here, self-excited vibration of each of the pressure-decrease valves 90-96 is explained.

For example, when the front left wheel 28 is braked, the pressure-increase valve 80 is opened to increase the hydraulic pressure in the wheel cylinder 32 (hereinafter, simply referred to as the "cylinder pressure", if appropriate). Then, the pressure-increase valve 80 and/or the pressure-decrease valve 90 are/is closed, as needed, to keep the increased cylinder pressure. In addition, for example, when the braking is released or stopped, the pressure-decrease valve 90 is opened to discharge the brake liquid from the wheel cylinder 32 and thereby decrease the cylinder pressure. During the decreasing of the cylinder pressure, the main body 172 of the plunger 132 may minutely vibrate in its axial directions due to, e.g., changes of the pressure difference between the higher hydraulic pressure on the side of the second port 164 and the lower hydraulic pressure on the side of the first ports 158. If this vibration continues at a considerably high intensity, noise may be produced. The vibration that produces the noise is called the "self-excited vibration". It is preferred that the hydraulic brake system be constructed such that the occurrence of self-excited vibration is minimized.

When the present hydraulic brake system carries out, e.g., an anti-lock control, the cylinder pressure may be decreased even during the braking of the vehicle. In addition, when the present hydraulic brake system carries out a traction control or a running-vehicle stabilizing control (i.e., a yawing stabilizing control), the cylinder pressure may be increased for the other purpose than the braking of the vehicle.

It is speculated that the self-excited vibration is related to the flow amount of the brake liquid, the cylinder pressure, the hydraulic pressure in the plunger chamber 170 (i.e., in the housing 120), etc. each when the cylinder pressure is decreased. For example, if the pump 70 is operated in a state in which the pressure-decrease valve 90 is closed, then the hydraulic pressure in the plunger chamber 170 becomes negative. In this state, if the pressure-decrease valve 90 is opened to discharge the brake liquid from the wheel cylinder 32, then the self-excited vibration is likely to occur. One reason for this can be speculated such that if the hydraulic pressure in the plunger chamber 170 is decreased to a pressure excessively lower than an atmospheric pressure, then gas dissolved in the brake liquid is likely to separate therefrom and form bubbles (this phenomenon may be called "cavitation"), that is, such that if bubbles are present in the brake liquid in the plunger chamber 170, resistance of the brake liquid exerted to the movement of the plunger 132 toward and away from the valve seat 128 is largely decreased, so that the plunger 132 is likely to be vibrated, i.e., self-excited. In particular, it is estimated that the bubbles produced in the spring chamber 181 cannot be easily removed and will have strong influences.

Figure 4:
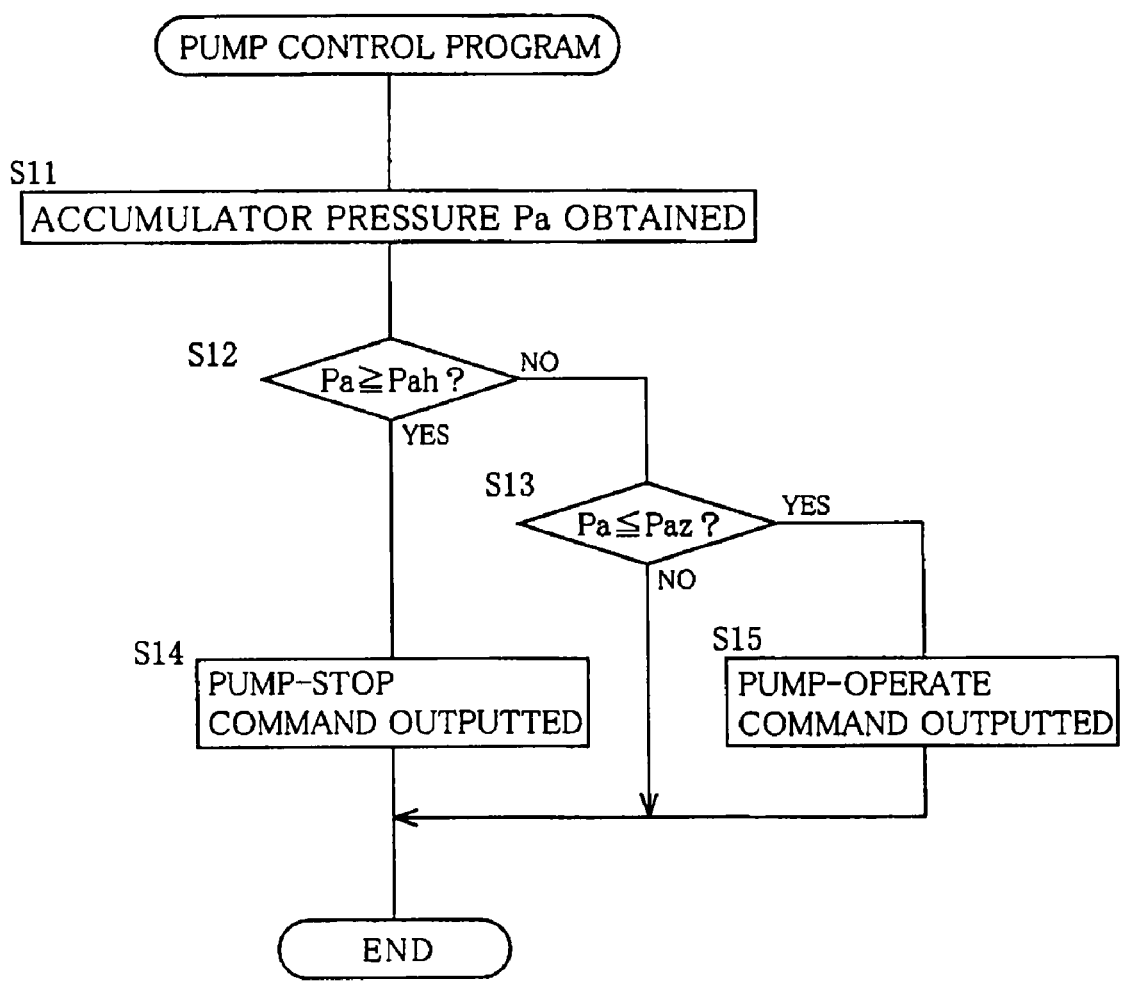
FIG. 4 is a flow chart representing a program used to control a pump employed by the hydraulic brake system.

Here, the operation of the pump 70 is described. The pump 70 is controlled such that a pump control program stored in the memory is carried out by the computer of the ECU 250 at very short cyclic times and appropriate commands are supplied to the driver circuit 260. FIG. 4 is a flow chart representing the pump control program.

First, at Step S11, a hydraulic pressure $P_a$ in the pressure-increase passage 98 is obtained based on an output signal of the hydraulic-pressure sensor 110. In the present embodiment, the hydraulic pressure $P_a$ in the pressure-increase passage 98 is regarded as being equal to a hydraulic pressure in the accumulator 74 (hereinafter, simply referred to as the "accumulator (ACC) pressure"), and is treated as the accumulator pressure $P_a$.

Next, at Step S12, it is judged whether the accumulator pressure $P_a$ is equal to, or higher than, a higher threshold value $P_{ah}$. If a negative judgment is made at Step S12, the control goes to Step S13 to judge whether the accumulator pressure $P_a$ is equal to, or lower, than a lower threshold value $P_{az}$ ($<P_{ah}$). If a positive judgment is made at Step S13, the control goes to Step S15 to produce a command to operate the pump 70. Thus, the driver circuit 260 supplies a drive power to the electric motor 72. In the present embodiment, the drive power supplied by the driver circuit 260 to the electric motor 72 has a pre-selected voltage. On the other hand, if a positive judgment is made at Step S12, the control goes to Step S14 to produce a command to stop the pump 70. Thus, the driver circuit 260 stops the supplying of the drive power to the electric motor 72.

In the present embodiment, the pump 70 is operated or stopped based on the output of the hydraulic-pressure sensor 110. However, the pump 70 may be operated or stopped based on an output of a pressure switch. More specifically described, the pressure-increase passage 98 may be provided with such a pressure switch that turns ON when the accumulator pressure $P_a$ is lower than the lower threshold value $P_{az}$, and turns OFF when the pressure $P_a$ is higher than the higher threshold value $P_{ah}$.

As described above, the pump 70 is operated if the accumulator pressure $P_a$ is excessively decreased, so that the accumulator pressure $P_a$ is generally maintained within a pre-selected pressure range, as will be described later. On the other hand, if the pump 70 is operated, then the hydraulic pressure in the plunger chamber 170 is decreased. Therefore, if the hydraulic pressure in the plunger chamber 170, in particular, the spring chamber 181 thereof can be prevented from being excessively decreased, then the generation of gaseous bubbles can be effectively restrained and accordingly the self-excited vibration of each pressure-decrease valve 90-96 can be effectively restrained. The above-described buffer 114 and restrictor-valve device 116 can prevent the excessive decrease of the hydraulic pressure in the plunger chamber 170 when the pump 70 is operated. The buffer 114 and the restrictor-valve device 116 will be described in more detail, below.

Figure 5:
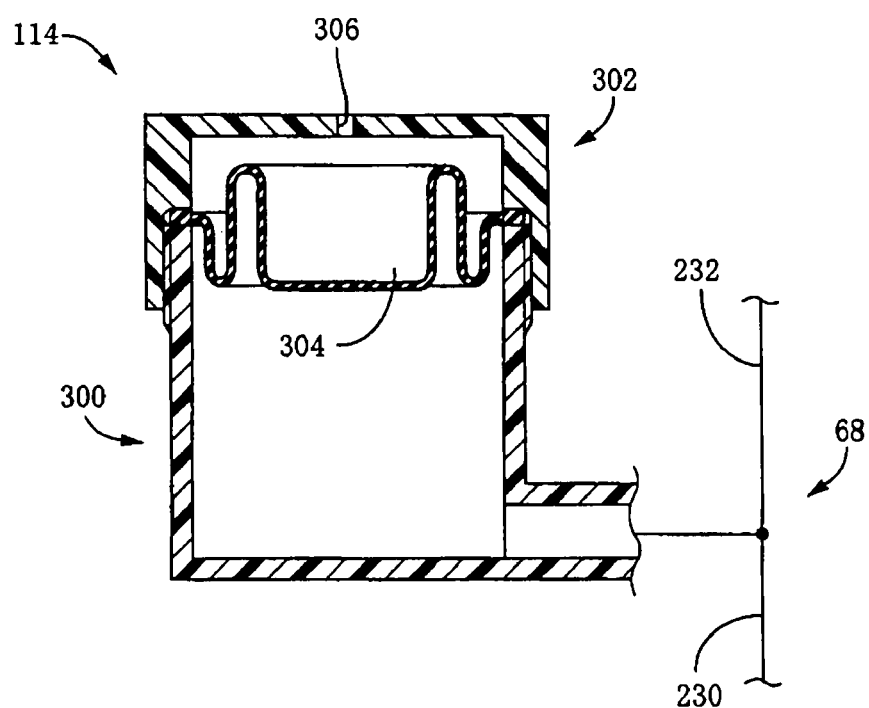
FIG. 5 is a front cross-sectional view of a buffer employed by the hydraulic brake system.

FIG. 5 schematically shows the buffer 114 that decreases a first suction resistance as a resistance exerted to the brake liquid sucked from the reservoir-communication passage 68 by the pump 70. The buffer 114 includes a resin-based cylindrical container 300; a resin-based cap 302; and a synthetic-rubber-based diaphragm 304. A lower end of the cylindrical container 300 is closed. The cap 302 liquid-tightly fits on an upper end of the cylindrical container 300 so as to close the upper end. The cap 302 has a through-hole 306 that is formed through a thickness of a central portion thereof and that has a small diameter. Thus, a space above the diaphragm 304 is kept at an atmospheric pressure. The diaphragm 304 is provided between the cylindrical container 300 and the cap 302, and separates an inner space of the container 300 from an outer space. The diaphragm 304 is of a convolution type wherein movement of a 180-degree-folded portion thereof causes change of a volume of the container 300.

The buffer 114 is disposed at a height position lower than a height position where the reservoir 36 is disposed. The buffer 114 is arranged such that while the pump 70 is stopped, the brake liquid flows from the reservoir 36 into the buffer 114 via the reservoir hose 232 and, while the pump 70 is operated, the brake liquid is discharged from the buffer 114 and is supplied from the buffer 114 and the reservoir hose 232 to the suction port 76 of the pump 70. That is, at least a portion of the brake liquid sucked by the pump 70 is supplied from the buffer 114.

The buffer 114 is connected to an end portion of the reservoir hose 232 that is connected to the reservoir-connection port 230, so that the buffer 114 is provided at the nearest possible position to the pump 70. Consequently a resistance to the suction of the brake liquid can be largely decreased as compared with the case where all portions of the brake liquid are sucked from the reservoir 36. Therefore, an amount of the brake liquid sucked from the pressure-decrease passage 100 can be largely decreased. Thus, the hydraulic pressure in the plunger chamber 170 (in particular, the spring chamber 181) of each pressure-decrease valve 90-96 can be prevented from being excessively lowered, and accordingly the self-excited vibration of each pressure-decrease valve 90-96 can be effectively restrained. Usually, the operation of the pump 70 continues several seconds (e.g., three seconds). On the other hand, the volume of the buffer 114 is pre-selected at a value larger than a total amount of the brake liquid that can be sucked by the pump 70 for about ten seconds.

The buffer 114 may be provided with a spring, not shown, that biases the diaphragm 304 toward the cap 302. In this case, owing to an elastic force of the spring, the buffer 114 can more quickly suck the brake liquid. The elastic force of the spring may be considerably small and must not be so large as to match the suction force of the pump 70.

The changes of volume of the buffer 114 are allowed by the diaphragm 304. However, the changes of volume may be allowed by a bag-like container (e.g., a bladder) whose shape can be easily changed.

Figure 6:
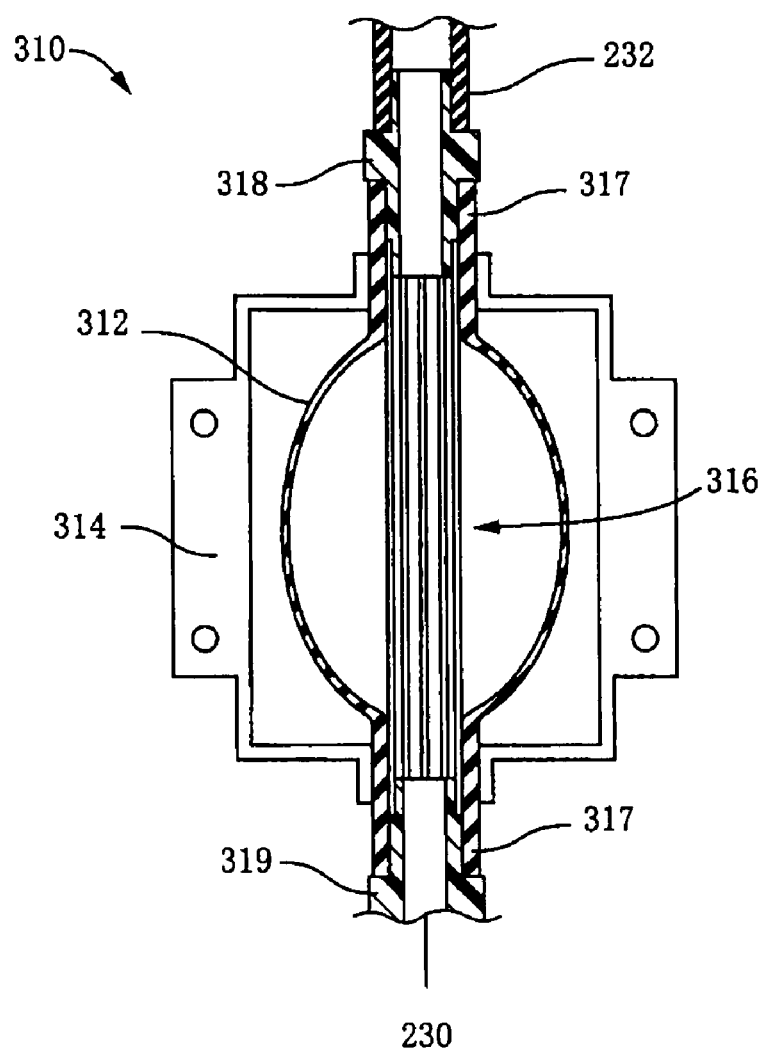
FIG. 6 is a front cross-sectional view of another buffer that may be employed by the hydraulic brake system.

FIG. 6 shows a buffer 310 that may be used in place of the buffer 114 and that likewise decreases the first suction resistance. The buffer 310 includes a spherical container 312 whose shape can be easily changed; a case 314 that surrounds the spherical container 312; and a flow-passage securing portion 316 that secures a brake-liquid flow passage. The case 314 has a cylindrical wall with axially opposite end walls, and is divided into two members by a plane parallel to an axis line thereof. The two members are fastened to each other such that each of two cylindrical open end portions 317 of the spherical container 312 is sandwiched by the two members. Thus, the case 314 protects and supports the spherical container 312. Since the case 314 does not have gas-tightness, an inner space of the case 314 is kept at an atmospheric pressure. The flow-passage securing portion 316 includes a plurality of (e.g., eight) thin metallic rods which are arranged along a cylindrical surface and opposite ends of each of which are supported by two joints 318, 319, respectively. A diameter of the above-described cylindrical surface is larger than an inner diameter of the reservoir hose 232. Therefore, even if the spherical container 312 may be excessively shrunk, the reservoir-communication passage 68 can keep an appropriate liquid-flow area.

The spherical container 312 is liquid-tightly connected via the joint 318 to the reservoir hose 232, and is liquid-tightly connected via the joint 319 to the reservoir-connection port 230, so that the spherical container 312 is connected in series to the reservoir-communication passage 68 and the brake liquid can flow through the container 312. The spherical container 312 is formed of a synthetic rubber, and a spherical wall thereof that separates an inner space thereof from an outer space is so thin that the container 312 is easily deformable. Like the buffer 114, the spherical container 312 is provided at a height position lower than the height position where the reservoir 36 is provided. While the pump 70 is stopped, the spherical container 312 can expand to accommodate the brake liquid flowing from the reservoir 36; and while the pump 70 is operated, the spherical container 312 can shrink to discharge the brake liquid so as to supply the liquid to the suction port 76 of the pump 70. Consequently a resistance to the suction of the brake liquid from the reservoir-communication passage 68 can be largely decreased as compared with the case where all portions of the brake liquid are sucked from the reservoir 36. Therefore, an amount of the brake liquid sucked from the pressure-decrease passage 100 can be largely decreased. Thus, the hydraulic pressure in the plunger chamber 170 (in particular, the spring chamber 181) of each pressure-decrease valve 90-96 can be prevented from being excessively lowered, and accordingly the self-excited vibration of each pressure-decrease valve 90-96 can be restrained.

Preferably the inner diameter of the peripheral container 312 is twice, three times, or more times larger than that of the reservoir hose 232. As the inner diameter of the peripheral container 312 increases, the amount of the brake liquid that can be supplied to the pump 70 increases. In the present embodiment, the inner diameter of the peripheral container 312 is more than four times larger than that of the reservoir hose 232. Meanwhile, the peripheral container 312 may be formed integrally with the reservoir hose 232. In the case where the peripheral container 312 has a sufficiently high strength, the reservoir hose 232 may be omitted. In addition, in the case where the peripheral container 312 has a sufficiently large volume and cannot be excessively largely shrunk, the flow-passage securing portion 316 can be omitted.

Figure 7:
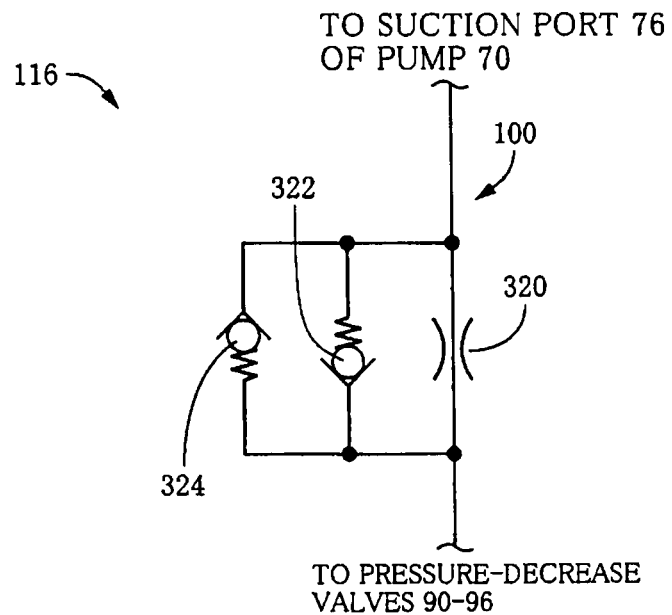
FIG. 7 is a diagrammatic view of a restrictor-valve device employed by the hydraulic brake system.

FIG. 7 shows the restrictor-valve device 116 as a flow-passage restricting device. The restrictor-valve device 116 includes an orifice 320 as a restrictor; a pressure-decrease check valve 322; and a liquid-charge check valve 324.

The orifice 320 is connected in series to the pressure-decrease passage 100, and largely increases a resistance to flowing of the brake liquid therethrough. Thus, the orifice 320 largely increases a resistance of the pressure-decrease passage 100 to suction of the brake liquid by the pump 70. That is, the amount of the brake liquid sucked from the pressure-decrease passage 100 when the pump 70 is operated, is largely decreased. Consequently the rate of lowering of the hydraulic pressure in the plunger chamber 170 (in particular, the spring chamber 181) of each pressure-decrease valve 90-96 is largely decreased, and accordingly the self-excited vibration of each pressure-decrease valve 90-96 can be effectively restrained.

The pressure-decrease check valve 322 is for preventing the flowing of the brake liquid from the pump 70 to each pressure-decrease valve 90-96. The check valve 322 is provided in parallel with the orifice 320. A valve-opening pressure of the check valve 322 is higher than a pressure difference across the same 322 when the pump 70 is operated in a state in which the pressure-decrease valves 90-96 are closed, and is lower than an atmospheric pressure. That is, the pressure-decrease check valve 322 is not opened by even the highest one of the pressure difference values across the check valve 322 (i.e., a sort of pressure difference when the brake liquid is sucked by the pump 70) when the pump 70 is operated in the state in which the pressure-decrease valves 90-96 are closed. On the other hand, the pressure-decrease check valve 322 is opened by a pressure difference across the same 322 caused by the flowing of the brake liquid discharged from each wheel cylinder 32, 34, 50, 62 via the corresponding pressure-decrease valve 90-96 when the cylinder pressure is decreased. Thus, the check valve 322 allows the flowing of the brake liquid from each pressure-decrease valve 90-96 toward the pump 70. That is, in the state in which the pressure-decrease valves 90-96 are closed, the pressure-decrease check valve 322 decreases the liquid-flow cross-section area of the pressure-decrease passage 100 so as to restrict the flowing of the brake liquid therethrough; and, when the cylinder pressure is decreased by discharging the brake liquid from each wheel cylinder 32, 34, 50, 52, the check valve 322 increases the liquid-flow cross-section area of the pressure-decrease passage 100, i.e., removes the restriction to the flowing of the brake liquid therethrough, so as to allow the brake liquid to be discharged at a sufficiently high rate.

The liquid-charge check valve 324 is for preventing the flowing of the brake liquid from each pressure-decrease valve 90-96 toward the pump 70. The liquid-charge check valve 324 is provided in parallel with the orifice 320 and the pressure-decrease check valve 322. The liquid-charge check valve 324 is not opened when the vehicle is braked or when the braking is released or stopped. When a new vehicle is assembled or the vehicle is subjected to maintenance, the liquid-charge check valve 324 is opened by a charging pressure of the brake liquid when the brake liquid is charged through the reservoir passage 68. Thus, the charging of the brake liquid is smoothened. However, the liquid-charge check valve 324 may be omitted. Even in the latter case, the self-excited vibration can be restrained.

When the cylinder pressure is decreased in a state in which the cylinder pressure is not higher than a pre-set pressure, the pump 70 may be operated to promote the discharging of the brake liquid. The pre-set pressure may be a value that is equal to, or somewhat higher than, a pressure assuring that the pressure-decrease check valve 322 is closed in the state in which the pump 70 is not operated or stopped.

Figure 8:
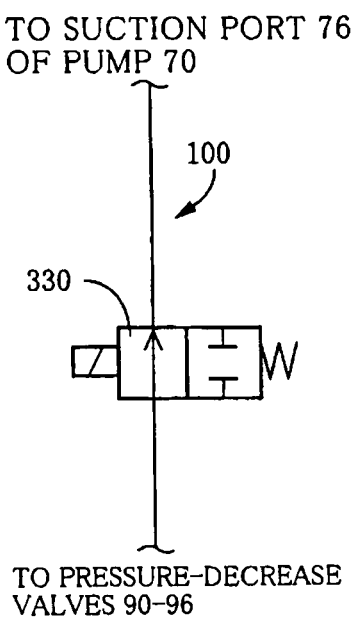
FIG. 8 is a diagrammatic view of a communication switch valve employed by the hydraulic brake system.

FIG. 8 shows a communication switch valve 330 that may be employed in place of the restrictor-valve device 116. The communication switch valve 330 switches the pressure-decrease passage 100 between a communication state thereof and a shut-off state thereof. The communication switch valve 330 is a normally-open solenoid valve, and normally places the pressure-decrease passage 100 in its communication state. The communication switch valve 330 may be one that has the same construction as that of a pressure-decrease valve disclosed by Japanese Patent Application Publication No. 2000-95094.

The communication switch valve 330 as the flow-passage restricting device is connected to the driver circuit 262. In response to a command supplied from the ECU 250, the communication switch valve 330 places the pressure-decrease passage 100 in its shut-off state. The memory of the ECU 250 stores a pressure-decrease-passage communication switching program. When the pressure-decrease-passage communication switching program is implemented, the communication switch valve 330 switches the pressure-decrease passage 100 between its communication state and its shut-off state. According to the pressure-decrease-passage communication switching program, in a state in which all the pressure-decrease valves 90-96 are closed and simultaneously the pump 70 is operated, the communication switch valve 330 places the pressure-decrease passage 100 in its shut-off state and, otherwise, the communication switch valve 330 places the pressure-decrease passage 100 in its communication state.

Owing to the pressure-decrease-passage communication switching program, the pressure-decrease passage 100 is placed in its communication state when the cylinder pressure is decreased. Thus, the brake liquid can be quickly discharged from each wheel cylinder 32, 34, 50, 52. On the other hand, when all the pressure-decrease valves 90-96 are closed and the pump 70 is operated, the pressure-decrease passage 100 is placed in its shut-off state. Thus, the excessive lowering of the hydraulic pressure in the plunger chamber 170 of each pressure-decrease valve 90-96 can be prevented and the self-excited vibration can be restrained.

In the present embodiment, a portion of the ECU 250 that implements the pressure-decrease-passage communication switching program constitutes a communication-switch-valve control portion.

In each of the above-described embodiments, even if one of the buffer 114 (or the buffer 310) and the restrictor-valve device 116 (or the communication switch valve 330) may be omitted, the excessive lowering of the hydraulic pressure in the plunger chamber 170 (in particular, the spring chamber 181) of each pressure-decrease valve 90-96 can be prevented and the self-excited vibration can be restrained.

Hereinafter, there will be described another embodiment of the present invention. In each of the above-described embodiments, the hydraulic pressure in the plunger chamber 170 (in particular, the spring chamber 181) is prevented from being excessively decreased, by restricting the suction of the brake liquid from the pressure-decrease passage 100. However, the hydraulic pressure in the plunger chamber 170 can be prevented from being excessively decreased, by decreasing a speed of rotation of the pump 70. The speed of rotation of the pump 70 can be calculated based on a speed of rotation of the electric motor 72 and a speed reduction ratio. In the case where the pump 70 is of a direct-drive type, the rotation speed of the pump 70 is equal to the rotation speed of the motor 72.

Figure 9:
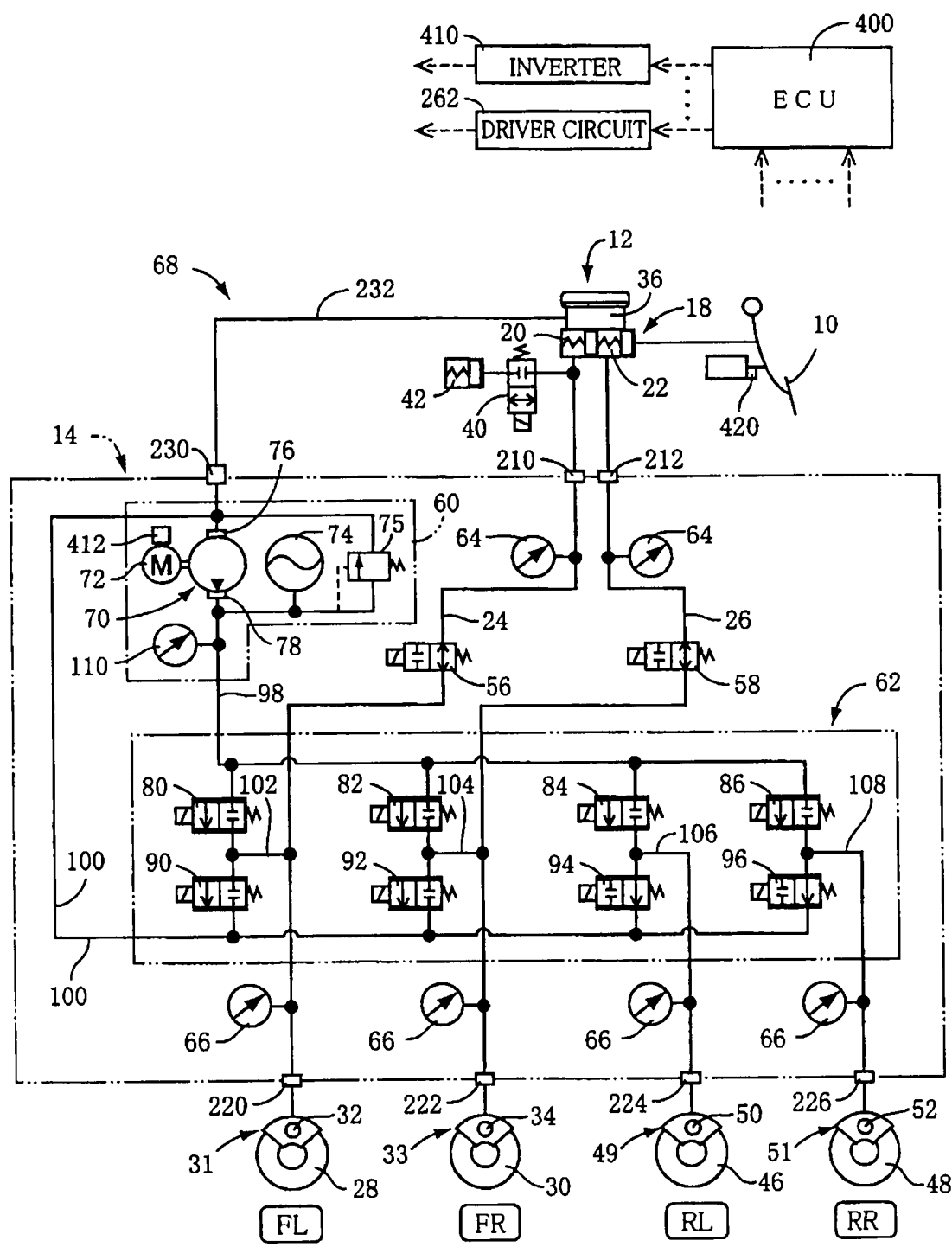
FIG. 9 is a diagrammatic view of another hydraulic brake system as another embodiment of the present invention.

FIG. 9 shows a hydraulic brake system as another embodiment. Since the present hydraulic brake system is basically identical with the hydraulic brake system shown in FIG. 1, only differences between the two hydraulic brake systems will be described below. In the present embodiment, an inverter 410 as a sort of driver circuit is connected to an output portion of an input-and-output portion of an ECU 400, and a rotation-speed sensor 412 that detects a speed of rotation of the electric motor 72 is connected to an input portion of the input-and-output portion. Upon reception of a command from the ECU 400, the inverter 410 adjusts, by PWM (i.e., pulse width modulation), an electric power to be supplied to the motor 72, and thereby controls the speed of rotation of the motor 72. That is, the ECU 400 can control the speed of rotation of the pump 70, by supplying, to the inverter 410, the command to adjust the speed of rotation of the motor 72. Thus, the inverter 410 is a sort of driver circuit that can adjust the electric power to be supplied to the motor 72.

Figure 10:
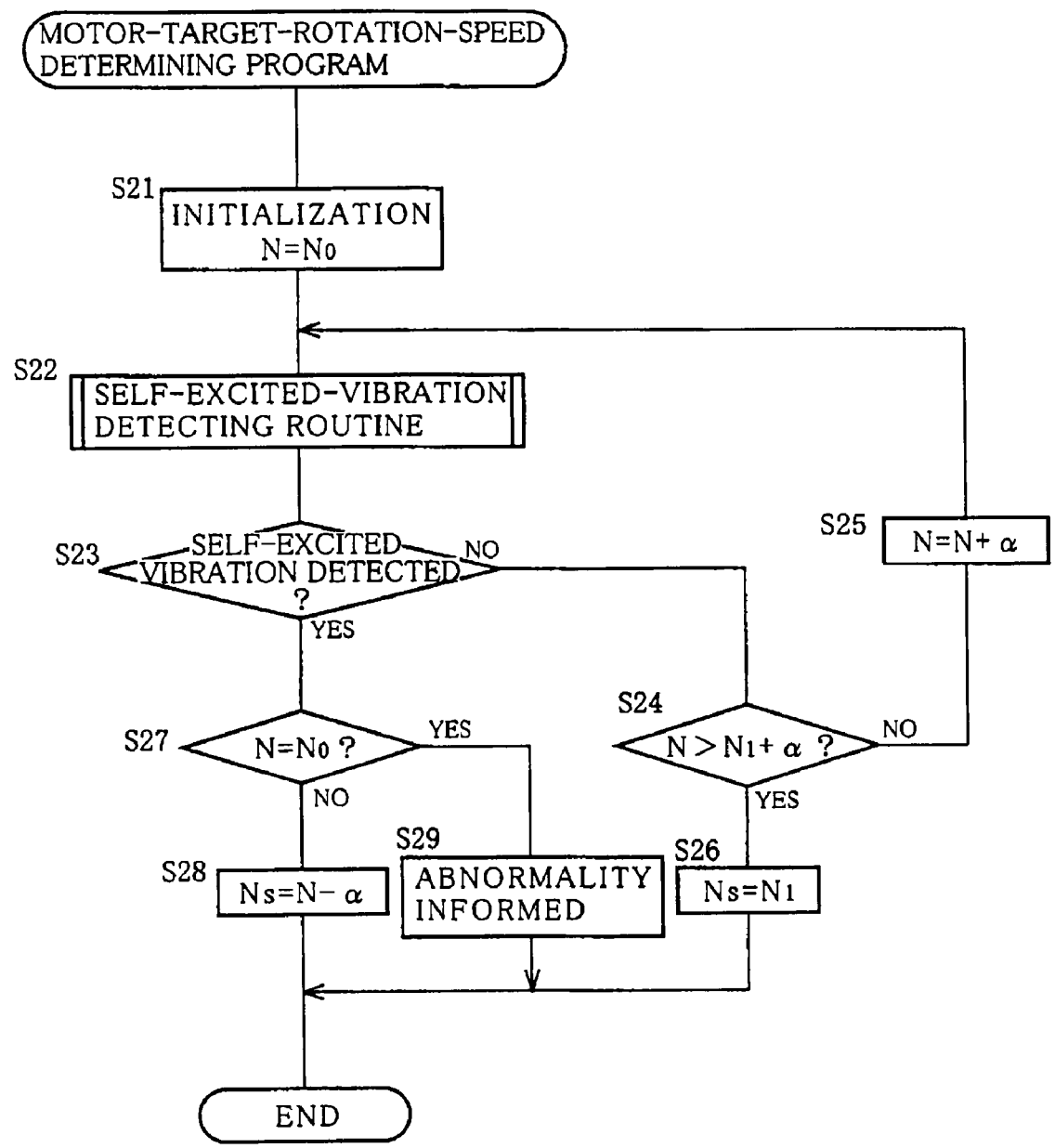
FIG. 10 is a flow chart representing a program used to determine a target rotation speed of an electric motor employed by the hydraulic brake system of FIG. 9.

A memory of the ECU 400 of the present hydraulic brake system stores a motor-target-rotation-speed determining program according to which a speed of rotation of the electric motor 72 that can prevent the occurrence of self-excited vibration is determined. FIG. 10 is a flow chart representing the motor-target-rotation-speed determining program. This program is implemented, when the vehicle is initially assembled or when the vehicle is subjected to maintenance, so as to determine a target rotation speed, $N_s$, of the motor 72 that can prevent the occurrence of self-excited vibration and that is as high as possible. Usually, somewhat different target rotation speeds $N_s$ are determined for different vehicles.

The determined target rotation speed $N_s$ is stored in the memory (e.g., a flash memory) of the ECU 400, and then is used in controlling the pump 70 when the vehicle is running. In addition, the motor-target-rotation-speed determining program is implemented when an operable portion, not shown, of the ECU 400 is operated by a driver in a pre-determined manner, i.e., when predetermined information is inputted into the ECU 400 via the operable portion. When this program is implemented, the pump 70 is controlled in a manner different from the manner (shown in FIG. 4) in which the pump 70 is controlled when the vehicle is normally running. Therefore, the manner of controlling of the pump 70 will be explained where appropriate.

At Step S21, an initialization process is carried out. For example, a variable, N, that represents a speed of rotation of the electric motor 72 is set at an initial value, $N_0$. The initial value $N_0$ is so pre-determined that substantially no self-excited vibration occurs. For example, the initial value $N_0$ may be pre-determined to be not greater than half a usually used rotation speed. Step S21 is followed by Step S22, i.e., a self excited-vibration detecting routine. Thus, when the self-excited-vibration detecting routine is implemented for the first time, the motor rotation speed N is equal to the initial value $N_0$. The self-excited-vibration detecting routine will be described in detail, later. However, the initial value $N_0$ may be different from the above-described value. For example, in the case where a temporary target rotation speed is determined using a test vehicle, the initial value $N_0$ may be determined to be somewhat lower than the temporary target rotation speed, for example, to be equal to a value obtained by subtracting, from the temporary target rotation speed, several times a pre-set value, $\alpha$, described later.

If, at Step S22, no self-excited vibration is detected, i.e., if a negative judgment is made at Step S23, the control goes to Step S24 to judge whether the variable number N has exceeded the sum of a pre-set rotation speed $N_1$ and a pre-set value $\alpha$. If a negative judgment is made at Step S24, the control goes to Step S25 to add the pre-set value $\alpha$ to the variable number N. Thus, after the rotation speed of the motor 72 is increased by a small amount, the automatic self-excited-vibration detecting operation is carried out again at Step S22. Meanwhile, if a positive judgment is made at Step S24 while the automatic self-excited-vibration detecting operation is repeated at Step S22, then the control goes to Step S26 to determine the pre-set rotation speed $N_1$ as a target rotation speed $N_s$. The pre-set rotation speed $N_1$ is, for example, an appropriate target rotation speed of the motor 72 (e.g., a rotation speed with a considerably high efficiency) for a case where it is not needed to restrain the occurrence of self-excited vibration. The value $\alpha$ may be pre-set at a value ranging from one tenth, to one hundredth, of the pre-set rotation speed $N_1$. It is desirable to pre-set, as the value $\alpha$, a great value for the purpose of quickly carrying out a target-rotation-speed determining operation. On the other hand, it is desirable to pre-set, as the value $\alpha$, a small value for the purpose of improving an accuracy of determination of target rotation speed $N_s$. In the present embodiment, the value $\alpha$ is pre-set at about one twentieth of the pre-set rotation speed $N_1$.

On the other hand, if a positive judgment is made at Step S23, the control goes to Step S27 to judge whether the variable number N is equal to the initial number $N_0$. If a negative judgment is, made at Step S27, the control goes to Step S28 to determine a target rotation speed $N_s$ by subtracting the pre-set value α from the variable number N at that time. The thus determined target rotation speed $N_s$ is equal to the greatest one of the numbers N before the self-excited vibration is detected. Thus, the rotation speed of the electric motor 72 is limited to speeds not higher than a pre-set rotation speed selected from one or more pre-set rotation speeds that has been, or have each been, judged as the speed assuring that the occurrence of the self-excited vibration is prevented. However, Step S28 may be modified such that the target rotation speed $N_s$ is obtained by subtracting a value greater than the pre-set value α, from the variable number N at that time. In the latter case, the probability that the self-excited vibration occurs can be further lowered. On the other hand, if a positive judgment is made at Step S27, i.e., if the self-excited vibration is detected in a state in which the variable number N is equal to the initial value $N_0$, it can be judged that an abnormality has occurred. In this case, the control goes to Step S29 where a display device displays an abnormality indication or an alarm-sound generating device generates an alarm sound.

Figure 11:
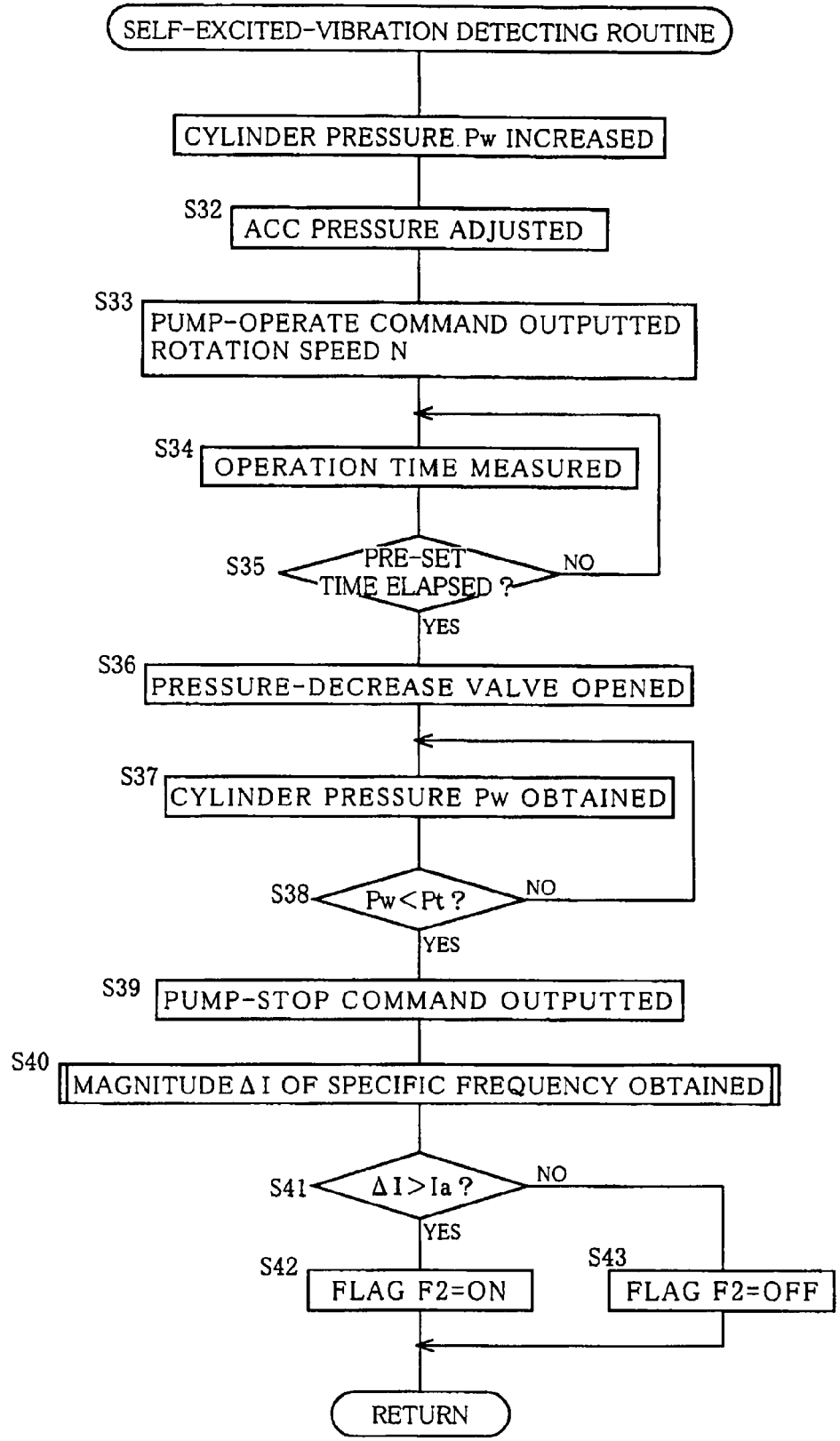
FIG. 11 is a flow chart representing a self-excited-vibration detecting operation for detecting a self-excited vibration of a linear solenoid valve employed by the hydraulic brake system of FIG. 9.

FIG. 11 is a flow chart representing the self-excited-vibration detecting operation carried out at Step S22. The following description relates to a particular case where the self-excited-vibration detecting operation is carried out to detect whether the self-excited vibration has occurred to a pre-selected one of the four pressure-decrease valves 90, 92, 94, 96, e.g., the pressure-decrease valve 90 corresponding to the front left wheel 28. In the present embodiment, the self-excited-vibration detecting operation is carried out with respect to one pressure-decrease valve 90 representative of the four valves 90-96 and, if the self-excited vibration is detected, then a rotation speed of the motor 72 at that time is regarded as being not appropriate; and if the self-excited vibration is not detected, then a rotation speed of the motor 72 at that time is regarded as being appropriate for preventing the occurrence of self-excited vibration.

However, it is possible to carry out respective self-excited-vibration detecting operations for two or more of the four pressure-decrease valves 90 through 96. In this case, it is possible to determine more reliably a target rotation speed of the motor 72 that does not cause the self-excited vibration. In addition, it is possible to carry out concurrently respective self-excited-vibration detecting operations for two or more (e.g., the two pressure-decrease valves 90, 92 corresponding to the two front wheels 28, 30) of the four pressure-decrease valves 90 through 96. In this case, it is possible to carry out quickly the self-excited-vibration detecting operations.

In the self-excited-vibration detecting operation, first, at Step S31, the master-cut valves 56, 58 are closed and the pressure-increase valve 80 is opened, so that the cylinder pressure $P_w$ is increased. Here, the cylinder pressure $P_w$ is increased to such a value that is appropriate for quick braking and is likely to cause the self-excited vibration when the cylinder pressure $P_w$ is decreased. That is, the cylinder pressure $P_w$ is increased to a considerably high value. Thus, under a condition that the self-excited vibration is likely to occur, the self-excited-vibration detecting operation is carried out. The cylinder pressure $P_w$ appropriate for quick braking may be the highest pressure that can be produced when the vehicle is braked during a normal running. Alternatively, the cylinder pressure $P_w$ appropriate for quick braking may be such a pressure that causes locking of the tire when the vehicle is running at a pre-set speed (e.g., 40 km/h).

At Step S32, the accumulator (Acc) pressure $P_a$ is adjusted to a pre-set value. Since the accumulator pressure $P_a$ is thus adjusted to the pre-set constant value when each detecting operation is started, the accuracy of detection of self-excited vibration is improved. Since the pre-set value is considerably low, the accumulator pressure $P_a$ does not exceed an upper limit thereof when the pump 72 is continuously operated for a time duration needed to detect the self-excited vibration. The pre-set value may be equal to a lower limit (described later) of the accumulator pressure $P_a$, or a value lower than the lower limit. However, if the accumulator pressure $P_a$ exceeds the upper limit by the operation of the pump 72, then the braking liquid is discharged through the relief valve 75. Therefore, even if the accumulator pressure $P_a$ may exceed the upper limit after the time duration needed to detect the self-excited vibration has elapsed, no problems are raised.

When the accumulator pressure $P_a$ is decreased, one or more pressure-decrease valves that are not subjected to the self-excited-vibration detecting operation, for example, the pressure-decrease valves 94, 96 corresponding to the rear wheels 46, 48, and the corresponding pressure-increase valves 84, 86 are opened, so that the brake liquid is discharged from the accumulator 74 into the reservoir 36 via the pressure-decrease passage 100 and the reservoir-communication passage 68 till the accumulator pressure $P_a$ is lowered to a pre-set value. On the other hand, when the accumulator pressure $P_a$ is increased, all the pressure-increase valves 80 through 86 are closed, and the pump 70 is operated at a considerably low rotation speed (e.g., half the above-described rotation speed $N_1$) till the accumulator pressure $P_a$ is raised to a pre-set value. After the accumulator pressure $P_a$ is thus adjusted, the pressure-increase valves 80 through 86 and the pressure-decrease valves 90 through 96 are closed.

At Step S33, the pump 70 is operated at the rotation speed N. This rotation speed N is equal to the rotation speed N determined at Step S21 or Step S25 of FIG. 10. If the pump 70 is operated for a pre-set time (e.g., several seconds) at Steps S34 and S35, then the control goes to Step S36 where the pressure-decrease valve 90 that is subjected to the self-excited-vibration detecting operation, is opened to discharge the brake liquid from the wheel cylinder 32. Thus, the pressure in the wheel cylinder 32 is decreased.

A degree of opening of the pressure-decrease valve 90 is set at not the highest degree but a considerably high degree that causes the brake liquid to discharge quickly, i.e., causes the cylinder pressure $P_w$ to decrease at a great gradient. Thus, the brake liquid is discharged under a condition that the self-excited vibration is likely to occur. For example, the degree of opening of the pressure-decrease valve 90 is set at three fourths of the highest degree, or set at such a degree that causes the cylinder pressure $P_w$ to decrease at three fourths of the greatest gradient. The reason why the pressure-decrease valve 90 is not opened to the highest degree is that if the end (i.e., the thin plate 194) of the plunger 132, located on the side of the spring 138, contacts the attraction surface 196, the occurrence of self-excited vibration is prevented.

Figure 12:
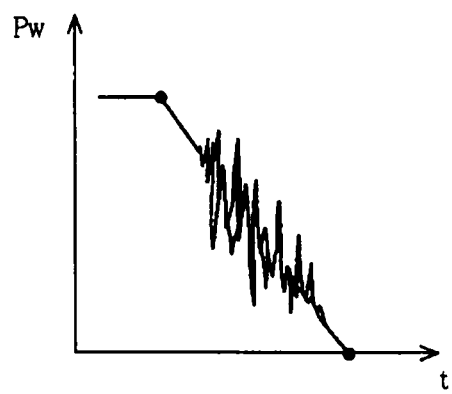
FIG. 12 is a graph illustratively showing changes of hydraulic pressure in a wheel cylinder when the self-excited vibration occurs to the linear solenoid valve employed by the hydraulic brake system of FIG. 9.

When the decreasing of pressure $P_w$ of the wheel cylinder 32 is started, the cylinder pressure $P_w$ is iteratively measured at Step S37, till the cylinder pressure $P_w$ becomes lower than a threshold value $P_t$ at Step S38. FIG. 12 illustratively shows changes of the cylinder pressure $P_w$ in the case where the self-excited vibration occurs. The threshold value $P_t$ is pre-set at a value at which the self-excited vibration is unlikely to occur. Subsequently, a command to stop the pump 70 is produced at Step S39.

Figure 13:
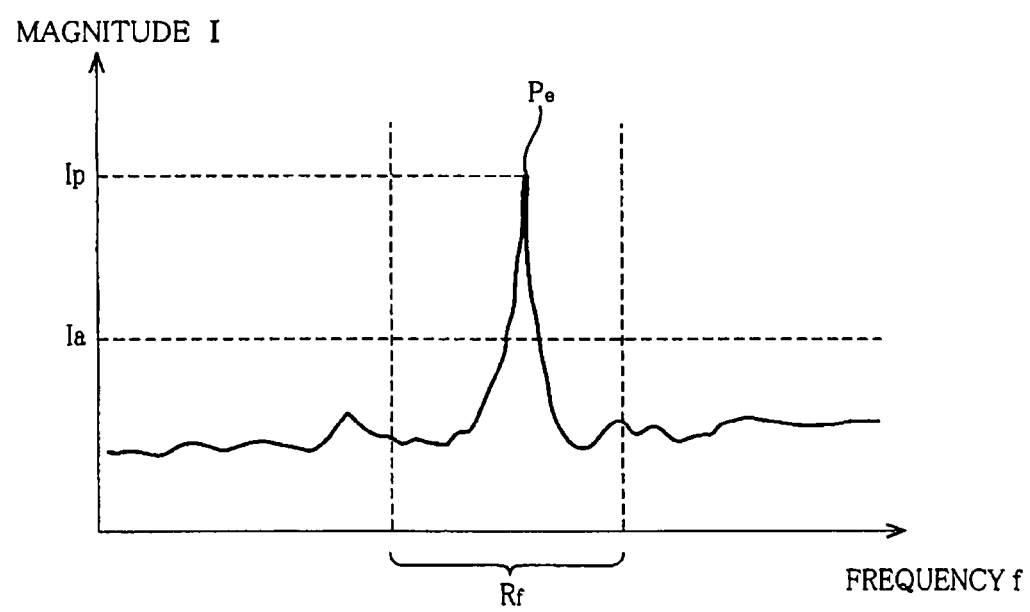
FIG. 13 is a graph illustratively showing a spectrum of the changes of the wheel-cylinder pressure.

At Step S40, the thus obtained changes of the cylinder pressure $P_w$ being decreased are subjected to a frequency analysis, e.g., a fast Fourier Transform (FFT). FIG. 13 illustratively shows an example of the thus obtained spectrum of changes of the cylinder pressure $P_w$. Regarding the example shown in FIG. 13, a maximum magnitude $\Delta I$ in a pre-selected frequency range $R_f$ (e.g., a magnitude $I_p$ of a peak $P_e$) is obtained. If it is judged, at Step S41, that the maximum magnitude $\Delta I$ is greater than a threshold value $I_a$, a flag F2 indicating that the self-excited vibration has been detected, is turned ON at Step S42. On the other hand, if it is judged that the maximum magnitude $\Delta I$ is not greater than the threshold value $I_a$, the flag F2 is turned OFF at Step S43. The content of the flag F2 is referred to at Step S23 of FIG. 10 and, if the flag F2 is ON, it is judged that the self-excited vibration has occurred.

Heretofore, the motor-target-rotation-speed determining routine and the self-excited-vibration detecting routine have been described.

Figure 14:
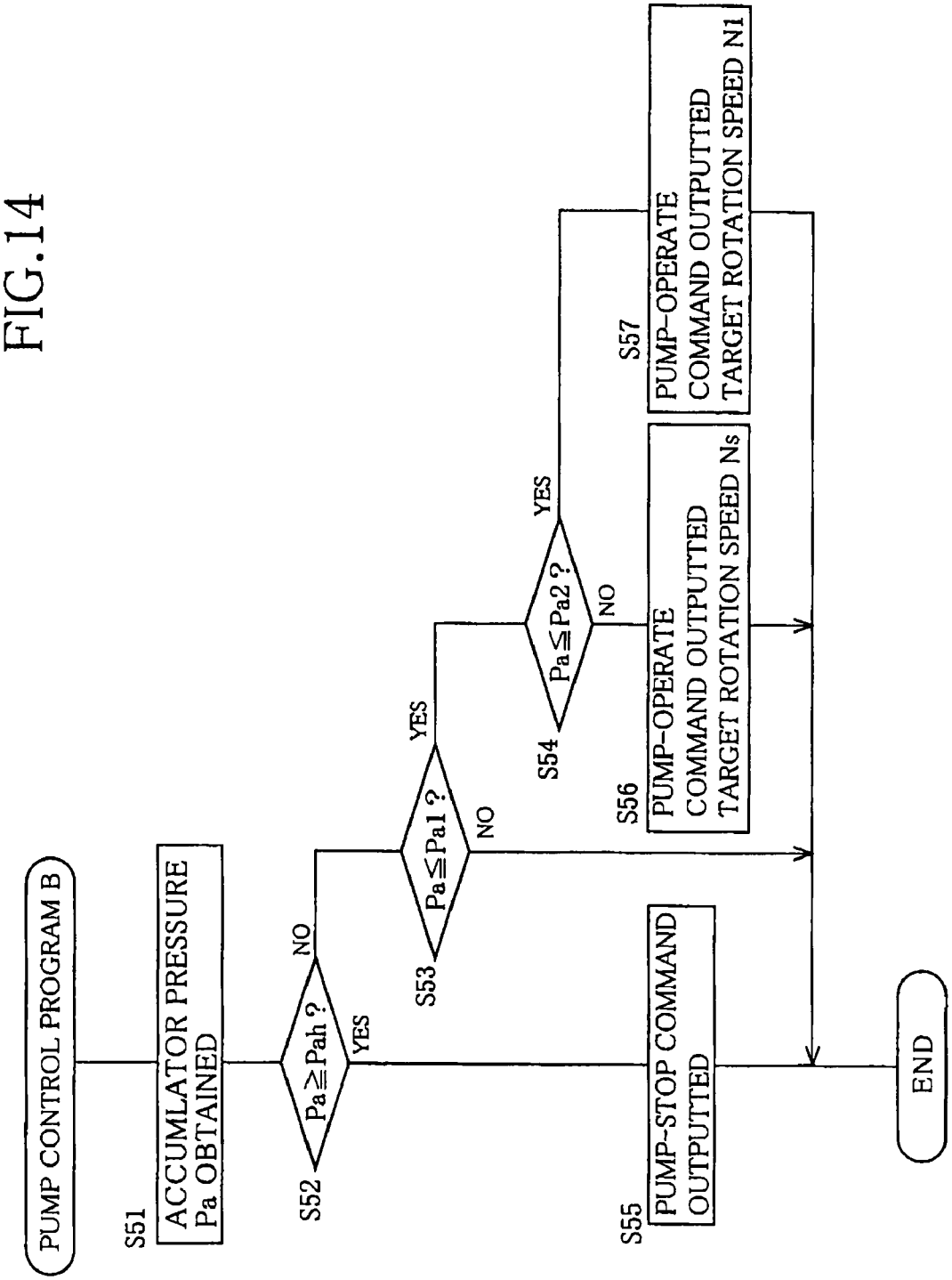
FIG. 14 is a flow chart representing a program used to control a pump employed by the hydraulic brake system of FIG. 9.
Figure 15:
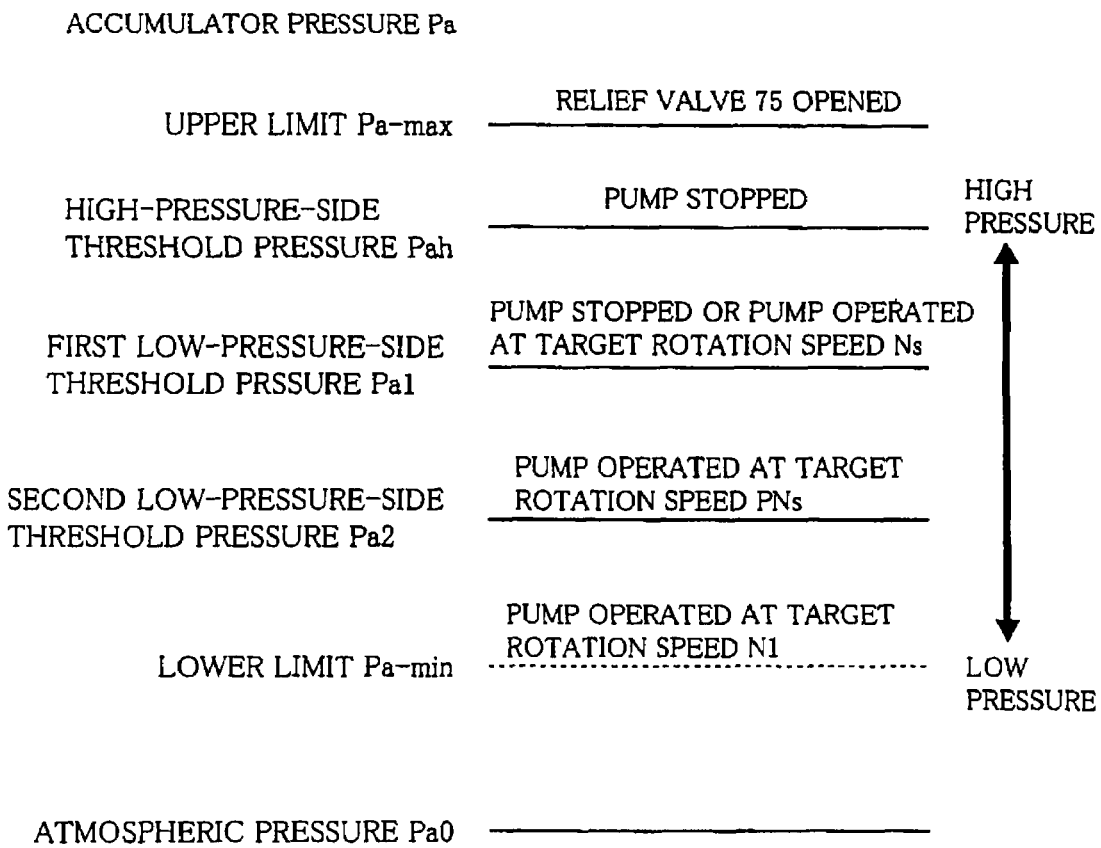
FIG. 15 is a map illustratively showing a relationship between pressure of an accumulator and operation of the pump, employed by the hydraulic brake system of FIG. 9.

Next, there will be described the control of the pump 70 according to the target rotation speed $N_s$ of the motor 72 that has been determined. FIG. 14 is a flow chart representing a pump control program B (the sign "B" indicates that the present program is different from the pump control program shown in FIG. 4). The present program is stored in a memory of the ECU 400, and is implemented iteratively at very short regular time intervals. FIG. 15 illustratively shows a relationship between accumulator pressure $P_a$ and operation of the pump 70.

(a) In the case where the accumulator pressure $P_a$ is judged, at Steps S53 and S54, to be not higher than a first low-pressure-side threshold $P_{a1}$ and higher than a second low-pressure-side threshold $P_{a2}$ ($<P_{a1}$), the target rotation speed $N_s$ stored in the memory is read out, at Step S56, to output a command to operate the pump 70 at the target speed $N_s$. In addition, the inverter 410 supplies electric power to the motor 72 so that the rotation speed of the motor 72 is controlled to the target speed $N_s$. Therefore, the hydraulic pressure in the plunger chamber 170 can be prevented from being excessively lowered by the operation of the pump 70, and accordingly the occurrence of self-excited vibration can be prevented.

(b) In the case where the accumulator pressure $P_a$ is judged, at Step S54, to be not higher than the second low-pressure-side threshold $P_{a2}$, the control goes to Step S57 to output a command to operate the pump 70 at the target speed $N_1$. If the rotation speed of the motor 72 remains restrained, then the accumulator pressure $P_a$ may be excessively lowered. In this case, the recovering of the accumulator pressure $P_a$ has priority to the prevention of occurrence of self-excited vibration.

(c) In the case where the accumulator pressure $P_a$ is judged, at Step S52, to be higher than a high-pressure-side threshold $P_{ah}$, the control goes to Step S55 to output a command to stop the pump 70.

(d) In the case where the accumulator pressure $P_a$ is judged, at Steps S52 and S53, to be lower than the high-pressure-side threshold $P_{ah}$ and higher than the first low-pressure-side threshold $P_{a1}$, no new command is produced so as to maintain the current state (i.e., the stopped state, or the operation state at the target rotation speed $N_s$).

As shown in FIG. 15, it is preferred that the accumulator pressure $P_a$ be higher than a lower limit $P_{a\text{-}min}$, for the purpose of obtaining a sufficiently great braking force. According to the above-described pump control program B, the accumulator pressure Pa is controlled to all within a pre-set pressure range defined by the lower limit $P_{a\text{-}min}$ and an upper limit $P_{a\text{-}max}$. In addition, the accumulator pressure $P_a$ is controlled to fall mainly within a pressure range not lower than the second low-pressure-side threshold value $P_{a2}$ and not higher than the high-pressure-side threshold value $P_{ah}$. This pre-set pressure range is commonly employed by the first embodiment shown in FIG. 4.

However, depending upon the current braking state, the accumulator pressure $P_a$ may be decreased although the motor 72 for the pump 70 is operated at the target rotation speed $N_s$. Even in such case, if the accumulator pressure $P_a$ becomes lower than the second low-pressure-side threshold value $P_{a2}$, the rotation speed of the motor 72 is increased as described above with respect to the case (c), so that the accumulator pressure $P_a$ is increased or the rate of decrease of the same $P_a$ is decreased. Thus, the accumulator pressure $P_a$ can be prevented from being lower than the lower limit $P_{a\text{-}min}$. If the accumulator pressure $P_a$ becomes lower than the lower limit $P_{a\text{-}min}$, then the motor 72 is operated at the target rotation speed $N_1$.

In the present embodiment, the second low-pressure-side threshold value $P_{a2}$ is pre-set at such a value that can prevent, if the motor 72 is operated at the target rotation speed $N_1$, the accumulator pressure $P_a$ from being lower than the lower limit $P_{a\text{-}min}$. Likewise, in the first embodiment shown in FIG. 4, the low-pressure-side threshold value $P_{az}$ is pre-set at such a value that can prevent the accumulator pressure $P_a$ from being lower than the lower limit $P_{a\text{-}min}$.

In the state in which the accumulator pressure $P_a$ is higher than the high-pressure-side threshold value $P_{ah}$, the pump 70 is stopped in usual cases. However, in special states such as the state in which the self-excited-vibration detecting operation is carried out, the pump 70 may be operated.

Figure 16:
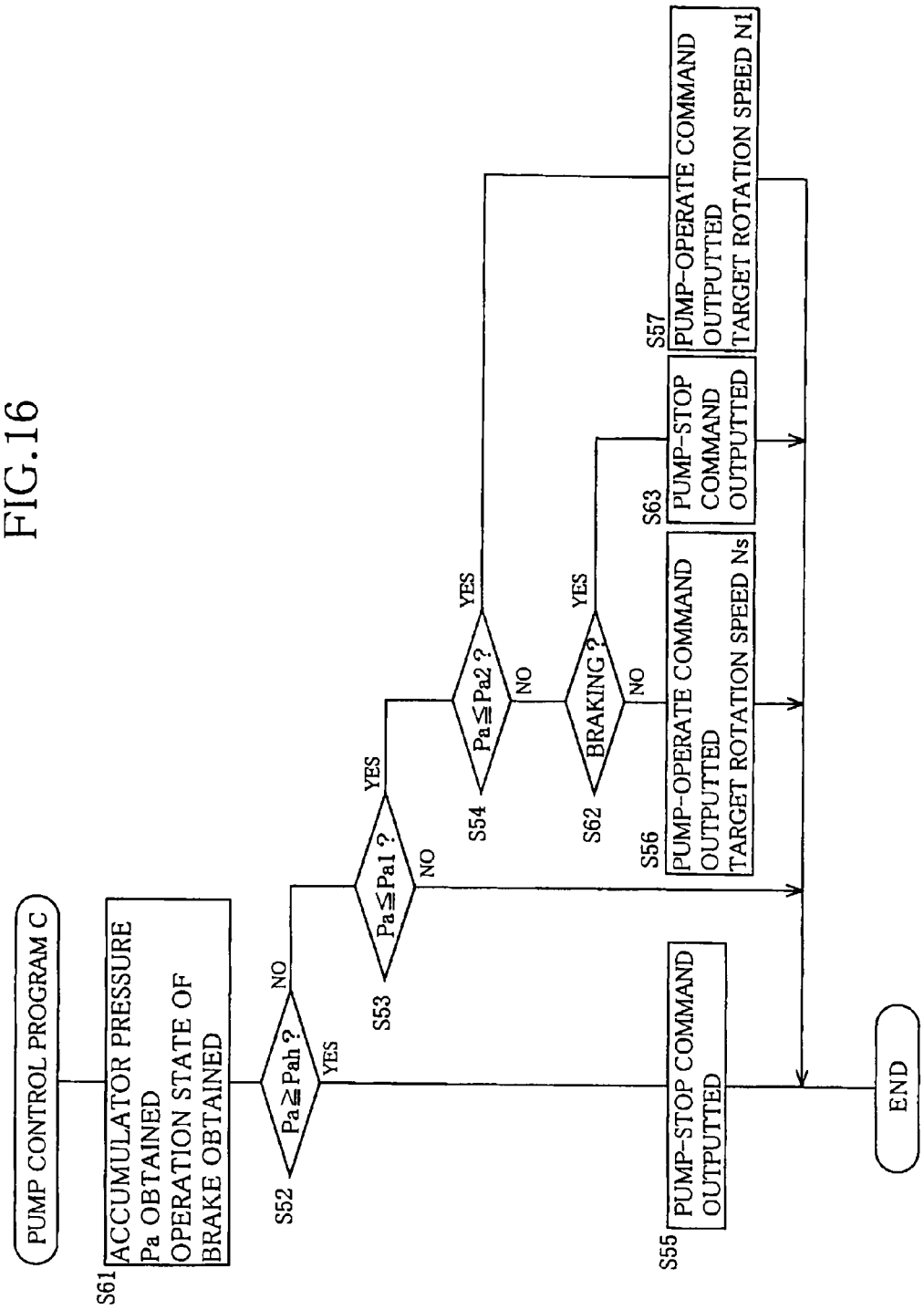
FIG. 16 is a flow chart representing another program used to control the pump employed by the hydraulic brake system of FIG. 9.

The pump control program B may be replaced with a pump control program C shown in FIG. 16. According to this program, the occurrence of self-excited vibration can be more reliably prevented by stopping the pump 70 during braking in the case where the accumulator pressure $P_a$ has a sufficiently large margin. The wheel cylinder 32 is decreased after braking is stopped. Therefore, if the pump 70 has been already stopped during braking, the hydraulic pressure in the plunger chamber 170 can be more reliably prevented from having been excessively largely lowered when braking is stopped. That is, in the case where the accumulator pressure $P_a$ has a sufficiently large margin (i.e., is higher than the second low-pressure-side threshold value $P_{a2}$), the operation of the pump 70 is inhibited during braking, so that when braking is stopped, the lowering of pressure of the plunger chamber 170 can be more reliably prevented. The same step numbers as used in FIG. 14 are used to designate the corresponding steps employed in FIG. 16, and the description of those steps is omitted.

At Step S61, an accumulator pressure $P_a$ is measured and, in addition, an operation state of the brake pedal 10 is obtained. The operation state of the brake pedal 10 can be obtained based on an output of a brake switch 420 that detects a depression of the pedal 10. The brake switch 420 is connected to the input-and-output portion of the ECU 400 and, when the brake pedal 10 is depressed, the switch 420 outputs an ON signal.

Steps S52 through S57 of FIG. 16 are identical with Steps S52 through S57 of FIG. 14, respectively.

At Step S62, the ECU 400 judges whether the vehicle is being braked. More specifically described, if the brake switch 420 is outputting the ON signal, then the ECU 400 judges that the vehicle is being braked, i.e., during braking. If a positive judgment is made at Step S62, the control goes to Step S63 to produce a command to stop the pump 70. On the other hand, if a negative judgment is made at Step S62, the control goes to Step S56 to produce a command to operate the pump 70 at the target rotation speed $N_s$. If the accumulator pressure $P_a$ is not higher than the second low-pressure-side threshold value $P_{a2}$, Step S62 is not carried out, and the control goes to Step S67 to produce a command to operate the pump 70 by rotating the motor 72 at the target rotation speed $N_1$.

The pump control program C may be modified such that during braking, the operation of the pump 70 is not inhibited but the rotation speed of the motor 72 is further limited to, e.g., half the target rotation speed $N_s$ or the initial rotation speed $N_0$. In this case, for example, Step S63 may be so modified as to produce a command to further lower the rotation speed of the motor 72. According to this modified control program, the occurrence of self-excited vibration can be more reliably prevented.

Figure 17:
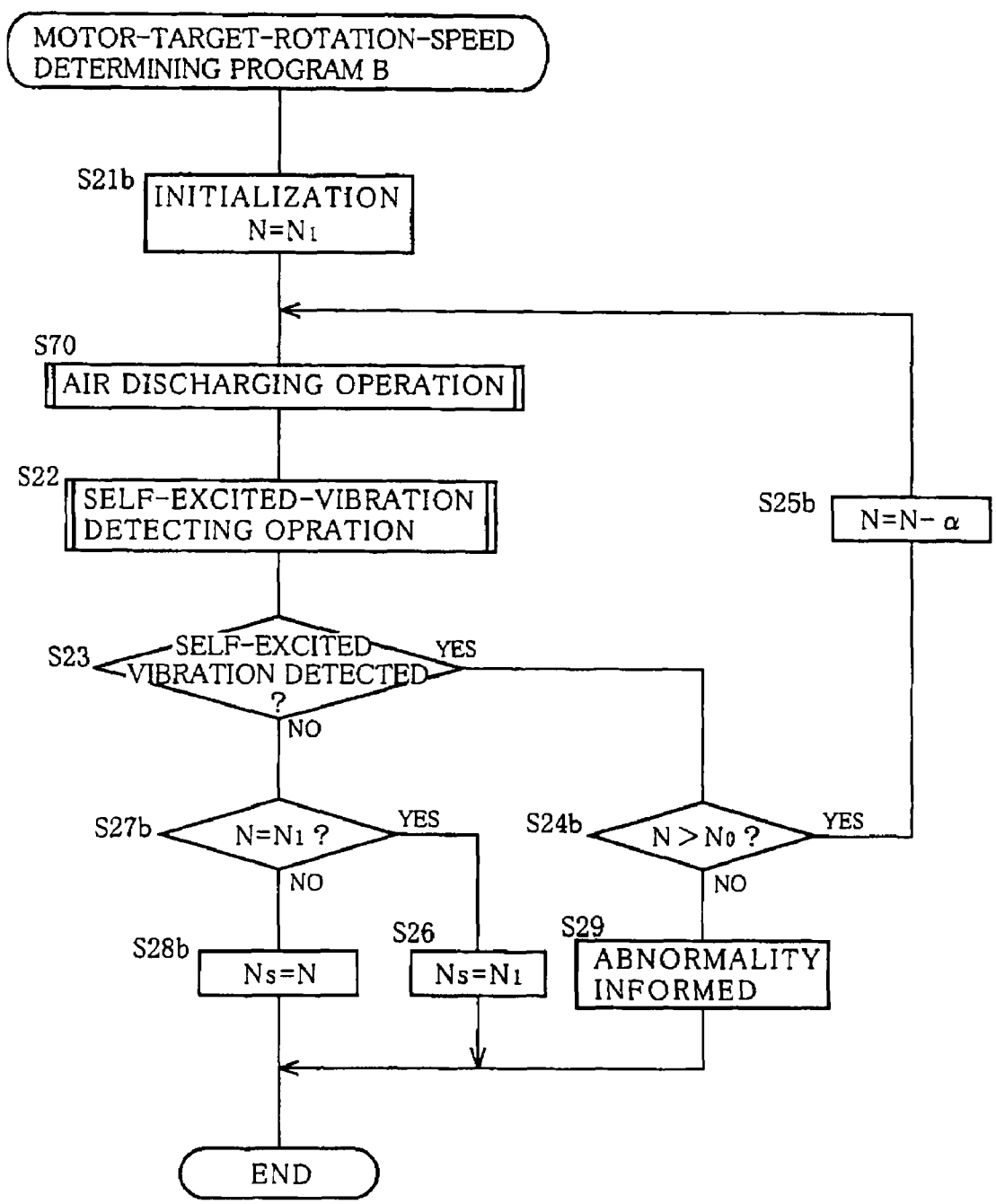
FIG. 17 is a flow chart representing another program used to determine a target rotation speed of the electric motor employed by the hydraulic brake system of FIG. 9.

In the motor-target-rotation-speed determining program shown in FIG. 10, the rotation speed of the motor 72 is stepwise increased, little by little, from the initial value $N_0$. However, this program may be replaced with a motor-target-rotation-speed determining program B shown in FIG. 17 (the sign "B" indicates that the latter program is different from the former program). In the program B, the self-excited-vibration detecting operation is carried out such that an initial value is set at the rotation speed $N_1$, and the rotation speed of the motor 72 is stepwise decreased little by little (i.e., in decrements each equal to, e.g., the pre-set value α) from the initial value $N_1$. The same step numbers as used in FIG. 10 are used to designate the corresponding steps employed in FIG. 17; and the same step numbers as used in FIG. 10 but given the sign "b" are used to designate the corresponding, but somewhat modified, steps employed in FIG. 17 (e.g., the signs $N_0$ and $N_1$ are replaced with each other, or different mathematical expressions are used).

The program C employs, before Step S22 corresponding to the self-excited-vibration detecting operation, Step S70 corresponding to an air discharging operation. According to this program C, if the self-excited vibration is detected, then the rotation speed of the motor 72 is decreased and the self-excited-vibration detecting operation is repeated. However, in the case where the self-excited vibration is detected, there is a possibility that air bubbles are present in the plunger chamber 170 (in particular, the spring chamber 181). If air bubbles are present in the plunger chamber 170, then the self-excited vibration is more likely to occur, and accordingly the accuracy of the self-excited-vibration detecting operation is lowered.

In the air discharging operation, the pressure-decrease valve 90 that is subjected to the self-excited-vibration detecting operation, and the corresponding pressure-increase valve 80 are opened and, in this state, the power hydraulic-pressure source 60 supplies a high-pressure brake liquid to the valves 80, 90, for a pre-set time duration, so as to discharge the air bubbles. When the air discharging operation is carried out, it is desirable that the accumulator pressure $P_a$ be not lower than a pre-set value (that is higher than the first low-pressure-side threshold pressure $P_{a1}$). In this case, even if air bubbles may be present in the spring chamber 181, the air bubbles can be reduced by the air discharging operation. Thus, the lowering of accuracy of the self-excited-vibration detecting operation can be avoided.

When the power hydraulic-pressure source 60 supplies the high-pressure brake liquid to the pressure-increase and pressure-decrease valves 80, 90, those valves 80, 90 can be opened and closed, one or more times. In this case, the air bubbles present in the plunger chamber 170 can be more easily removed. Alternatively, the communication switch valve 330 employed in the first embodiment may be provided in the pressure-decrease passage 100. In the latter case, if the plunger chamber 170 is supplied with the pressurized brake liquid in the state in which the communication switch valve 330 is closed, the air bubbles present in the plunger chamber 170 can be still more easily removed.

In the present embodiment, a portion of the ECU 400 that implements the pump control program B (or the pump control program C) constitutes a pump control device; a portion of the ECU 400 that carries out Step S56 of the pump control program B (or the pump control program C) constitutes a rotation-speed limiting portion; and a portion of the ECU 400 that carries out Steps S54 and S57 of the pump control program B (or the pump control program C) constitutes a rotation-speed-limitation canceling portion. The second low-pressure-side threshold pressure $P_{a2}$ corresponds to a threshold pressure recited in claims. In addition, a portion of the ECU 400 that implements the motor-target-rotation-speed determining program (or the motor-target-rotation-speed determining program B) constitutes a self-excited-vibration prevention judging portion; and a portion of the ECU 400 that carries out Steps S54, S62 and S63 of the pump control program C constitutes a braking-related rotation-speed limiting portion.

Hereinafter, there will be described another embodiment of the present invention.

In the above-described embodiment shown in FIG. 9, the inverter 410 is used to adjust the rotation speed of the motor 72. However, the rotation speed of the motor 72 may be adjusted or decreased by supplying intermittently electric power to the motor 72. That is, in the present embodiment, the lowering of hydraulic pressure in the plunger chamber 170 can be easily prevented without using the inverter 410. More specifically described, in the present embodiment, programs similar to the pump control program B (FIG. 14) or C (FIG. 16) and the motor-target-rotation-speed determining program (FIGS. 10 and 11) are implemented to output a pump-operate command and determine a target rotation speed of the motor 72. When the rotation speed of the motor 72 is adjusted to the determined target rotation speed, the electric power supplied to the motor 72 is controlled according to a program, described later, such that the supplying of electric power to the motor 72 is intermittently stopped, in other words, the electric power is intermittently supplied to the motor 72. The present embodiment relates to a hydraulic braking system having the construction shown in FIG. 9 except that the inverter 410 is replaced with the driver circuit 260 shown in FIG. 1 that drives the motor 72.

Figure 18:
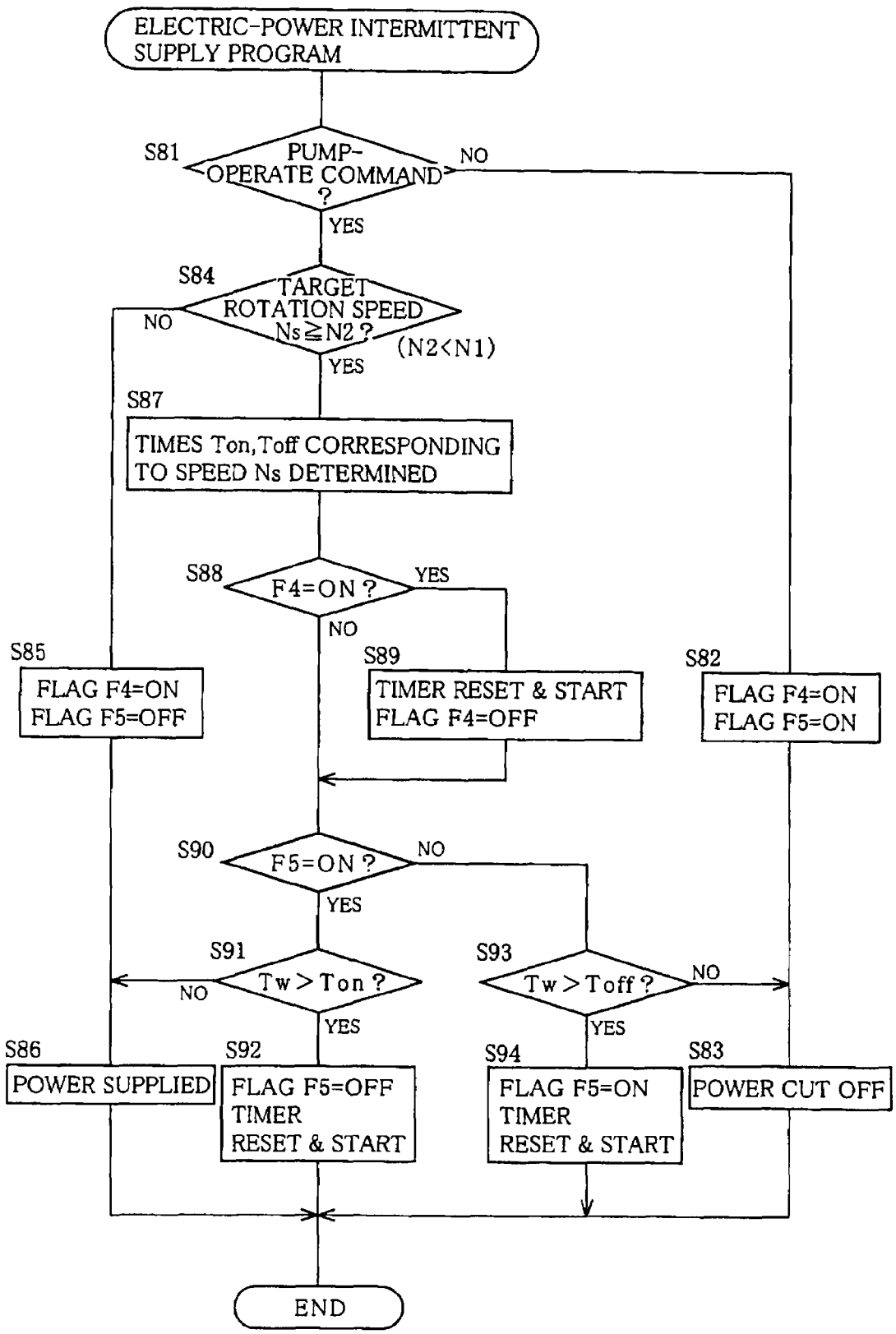
FIG. 18 is a flow chart representing another program used to supply intermittently electric power to a pump employed by another automotive-vehicle hydraulic brake system as another embodiment of the present invention.

FIG. 18 is a flow chart representing an electric-power intermittent supply program for supplying intermittently electric power to the motor 72. This program is for supplying intermittently electric power to the motor 72, based on the target rotation speed of the motor 72 determined or designated according to the pump control program B or C. The electric-power intermittent supply program is stored in the memory of the ECU 400, and is iteratively implemented by the computer of the ECU 400 at very short regular time intervals.

When this program is initially implemented, or when the pump-stop command is outputted at Step S55 (FIG. 14) or Step S39 (FIG. 11), a negative judgment is made at Step S81, and the control goes to Step S82, described later, and then goes to Step S83 to send the pump-stop command to the driver circuit 260. Thus, the supplying of electric power to the motor 72 is stopped, or a state in which no electric power is supplied to the motor 72 is kept.

On the other hand, when the pump-operate command is outputted at Step S56 or Step 57 (FIG. 14) or Step S33 (FIG. 11), a positive judgment is made at Step S81, and the control goes to Step S84 to judge whether the target rotation speed of the motor 72 is not lower than a pre-set rotation speed $N_2$ at which it is not necessarily required to supply intermittently to the motor 72. For example, the rotation speed $N_2$ is pre-set at a speed somewhat lower than the pre-set target rotation speed $N_1$. Therefore, if the target rotation speed of the motor 72 is lower than the pre-set rotation speed $N_2$, i.e., if a negative judgment is made at Step S84, the control goes to Step S85, described later, and goes to Step S86 where the electric power is continuously supplied to the motor 72.

On the other hand, if a positive judgment is made at Step S84, the control goes to Steps S87 through S94.

First, at Step S87, an electric-power supply time $T_{on}$ and an electric-power cut-off time $T_{off}$ are determined. More specifically described, experiments are performed, in advance, so as to obtain electric-power supply times $T_{on}$ and electric-power cut-off times $T_{off}$ that correspond to respective target rotation speeds $N_s$. The memory of the ECU 400 stores the relationship between (A) target rotation speeds $N_s$ and (B) electric-power supply times $T_{on}$ and electric-power cut-off times $T_{off}$. Thus, at Step S87, the electric-power supply time $T_{on}$ and the electric-power cut-off time $T_{off}$ that correspond to the current target rotation speed $N_s$ are read out from the memory of the ECU 400. However, it is possible to employ, as the electric-power supply time $T_{on}$, a constant time and employ, as the electric-power cut-off time $T_{off}$, variable times that vary in relation with the target rotation speeds $N_s$.

Immediately after the pump-stop command is changed to the pump-operate command, or immediately after the target rotation speed is changed from a value lower than the rotation speed $N_2$ to a value not lower than the same $N_2$, the control goes from Step S87 to Step 88, described later, and then goes to Step S89 to reset and start a timer. This timer measures an electric-power supply time $T_{on}$ or an electric-power cut-off time $T_{off}$. Step S89 is skipped till a flag F4 is turned ON again at Step S82 or Step S85.

At Step S90, it is judged whether an electric-power supply flag F5 is ON. If the flag F5 is ON, the control goes to Steps S91 and S86 to supply electric power to the motor 72 till a time $T_w$ measured by the timer exceeds the electric-power supply time $T_{on}$. If the time $T_w$ exceeds the electric-power supply time $T_{on}$, i.e., if a positive judgment is made at Step S91, the control goes to Step S92 to turn the flag F5 OFF. Therefore, when the present program is implemented for the next time, a negative judgment is made at Step S90 and the supplying of electric power to the motor 72 is stopped. At Step S92, the timer is reset to zero and then is started to measure the electric-power cut-off time $T_{off}$.

If the flag F5 is OFF and a negative judgment is made at Step S90, the control goes to Steps S93 and S83 to stop the supplying of electric power to the motor 72 till a time $T_w$ measured by the timer exceeds the electric-power cut-off time $T_{off}$. If the measured time $T_w$ exceeds the electric-power cut-off time $T_{off}$, i.e., if a positive judgment is made at Step S93, the control goes to Step S94 to turn the flag F5 ON. Therefore, when the present program is implemented for the next time, a positive judgment is made at Step S90 and the supplying of electric power to the motor 72 is resumed. At Step S94, the timer is reset to zero and then is started to measure the electric-power supply time $T_{on}$.

The flag F5 is turned ON at Step S82, so that immediately after the pump-stop command is changed to the pump-operate command, the electric power may be supplied to the motor 72. In addition, the flag F5 is turned OFF at Step S85, so that immediately after the target rotation speed is changed from a value not lower than the pre-set rotation speed $N_2$ to a value lower than the same speed $N_2$, the supplying of electric power to the motor 72 may be temporarily stopped.

Thus, according to the program shown in FIG. 18, the electric power is intermittently supplied to the motor 72 (i.e., the supplying of electric power to the motor 72 is intermittently stopped). Thus, eventually, the rotation speed of the motor 72 is decreased.

Meanwhile, the inverter 410 shown in FIG. 9 utilizes PWM (pulse width modulation) to repeat the supplying of electric power and the stopping of supplying of electric power, at very short time intervals. Therefore, it could be said that the inverter 410 intermittently supplies electric power to the motor 72. However, as far as the present embodiment is concerned, the phrase "intermittent supplying of electric power" means that electric power is continuously supplied and the supplying of electric power is continuously stopped, for respective much longer times (e.g., from 0.1 to 1.0 seconds) than a PWM unit time used by the inverter 410. Therefore, the inverter 410 does not correspond to an electric-power supply device that intermittently supplies electric power, defined in the present embodiment.

In the present embodiment, a portion of the ECU 400 that implements the electric-power intermittent supply program of FIG. 18 constitutes an intermittent-stop commanding portion; and the driver circuit 260 constitutes an electric-power supply device that intermittently supplies electric power.

In the present embodiment, the electric power is intermittently supplied to the motor 72 (or the supplying of electric power to the motor 72 is intermittently stopped), such that the electric-power supply time $T_{on}$ and the electric-power cut-off time $T_{off}$ are determined according to the target rotation speed. However, the present embodiment may be modified such that the rotation-speed sensor 412 that detects the rotation speed of the motor 72 is provided and, if the rotation speed of the motor 72 becomes higher than a first pre-set speed, the supplying of electric power is stopped and, if the rotation speed of the motor 72 becomes lower than a second pre-set speed lower than the first pre-set speed, the supplying of electric power is continued till the rotation speed exceeds the first pre-set speed. In this modified embodiment, the rotation speed of the motor 72 is equal to the rotation speed of the pump 70, and the first pre-set speed may be equal to the target rotation speed $N_s$ or a speed lower than the target speed $N_s$.

It is to be understood that the present invention may be embodied with various changes, modifications, and improvements that may occur to a person skilled in the art without departing from the spirit and scope of the invention defined in the appended claims.

What is claimed is:

1. A hydraulic brake system for a vehicle having a plurality of wheels, comprising:

at least one brake which corresponds to at least one of the wheels and which includes at least one wheel cylinder that is supplied with a brake liquid and applies a braking force corresponding to a pressure of the brake liquid, to said at least one wheel;

a pump which is driven by an electric motor and which includes a suction portion that sucks the brake liquid, pressurizes the sucked brake liquid, and additionally includes an output portion that outputs the pressurized brake liquid;

an accumulator which is connected to the output portion of the pump, stores the pressurized brake liquid outputted from the output portion, and can supply the pressurized brake liquid to said at least one wheel cylinder;

at least one linear solenoid valve which corresponds to said at least one wheel cylinder and which includes (a) at least one housing, (b) at least one valve portion including at least one valve member that is provided in at least one inner space of said at least one housing, and at least one valve seat that is opposed to said at least one valve member and has at least one valve opening that can be closed by said at least one valve member, (c) at least one plunger that is provided in said at least one inner space of said at least one housing, holds said at least one valve member, and can be reciprocated in opposite directions to move said at least one valve member toward, and away from, said at least one valve seat, (d) at least one spring that is provided in said at least one inner space of said at least one housing and biases said at least one plunger in one of said opposite directions, and (e) at least one solenoid that applies, to said at least one plunger, a drive force in an other of said opposite directions, wherein said at least one inner space of said at least one housing includes at least one first fluid chamber that is located, with respect to said at least one valve seat, on a side of said at least one valve member, said at least one plunger and said at least one spring, and is connected to the suction portion of the pump via a pressure-decrease liquid passage, and at least one second fluid chamber that is located, with respect to said at least one valve seat, on a side opposite to said at least one valve member, said at least one plunger and said at least one spring, and is connected to said at least one wheel cylinder via at least one cylinder-side liquid passage;

a reservoir which accommodates the brake liquid at an atmospheric pressure;

a liquid-supply passage which connects between the reservoir and the suction portion of the pump; and a hydraulic-pressure-decrease restraining device which restrains, when the brake liquid is sucked by the suction portion of the pump, an amount of decreasing from the atmospheric pressure of a pressure of the brake liquid in said at least one first fluid chamber of said at least one housing, wherein the hydraulic-pressure-decrease restraining device includes a self-excited-vibration prevention judging portion which carries out a plurality of pressure-change detecting operations in each of which, when said at least one linear solenoid valve is opened and the brake liquid is discharged from said at least one wheel cylinder in a state in which said at least one wheel cylinder is charged with the pressurized brake liquid and a rotation speed of the electric motor is kept at a corresponding one of a plurality of pre-set rotation speeds, changes of a hydraulic pressure in said at least one wheel cylinder are detected, wherein the self-excited-vibration prevention judging portion judges, based on the changes of the hydraulic pressure in said at least one wheel cylinder detected in said each of the pressure-change detecting operations, whether said one of the pre-set rotation speeds is a speed assuring that occurrence of a self-excited vibration is prevented, and a rotation-speed limiting portion which limits a rotation speed of the electric motor to a speed not higher than at least one pre-set rotation speed of said plurality of pre-set rotation speeds that has been judged, by the self-excited-vibration prevention judging portion, as said speed assuring that the occurrence of the self-excited vibration is prevented.

2. A hydraulic brake system for a vehicle having a plurality of wheels, comprising:

at least one brake which corresponds to at least one of the wheels and which includes at least one wheel cylinder that is supplied with a brake liquid and applies a braking force corresponding to a pressure of the brake liquid, to said at least one wheel;

a pump which is driven by an electric motor and which includes a suction portion that sucks the brake liquid, pressurizes the sucked brake liquid, and additionally includes an output portion that outputs the pressurized brake liquid;

an accumulator which is connected to the output portion of the pump, stores the pressurized brake liquid outputted from the output portion, and can supply the pressurized brake liquid to said at least one wheel cylinder;

at least one linear solenoid valve which corresponds to said at least one wheel cylinder and which includes (a) at least one housing, (b) at least one valve portion including at least one valve member that is provided in at least one inner space of said at least one housing, and at least one valve seat that is opposed to said at least one valve member and has at least one valve opening that can be closed by said at least one valve member, (c) at least one plunger that is provided in said at least one inner space of said at least one housing, holds said at least one valve member, and can be reciprocated in opposite directions to move said at least one valve member toward, and away from, said at least one valve seat, (d) at least one spring that is provided in said at least one inner space of said at least one housing and biases said at least one plunger in one of said opposite directions, and (e) at least one solenoid that applies, to said at least one plunger, a drive force in an other of said opposite directions, wherein said at least one inner space of said at least one housing includes at least one first fluid chamber that is located, with respect to said at least one valve seat, on a side of said at least one valve member, said at least one plunger and said at least one spring, and is connected to the suction portion of the pump via a pressure-decrease liquid passage, and at least one second fluid chamber that is located, with respect to said at least one valve seat, on a side opposite to said at least one valve member, said at least one plunger and said at least one spring, and is connected to said at least one wheel cylinder via at least one cylinder-side liquid passage;

a reservoir which accommodates the brake liquid at an atmospheric pressure;

a liquid-supply passage which connects between the reservoir and the suction portion of the pump; and a hydraulic-pressure-decrease restraining device which restrains, when the brake liquid is sucked by the suction portion of the pump, an amount of decreasing from the atmospheric pressure of a pressure of the brake liquid in said at least one first fluid chamber of said at least one housing, wherein the hydraulic-pressure-decrease restraining device includes a flow-passage restricting device which is provided in the pressure-decrease liquid passage and which, when the suction portion of the pump sucks the brake liquid in a state in which said at least one linear solenoid valve is closed, restricts flow of the brake liquid owing to a decreased area of flow of the pressure-decrease liquid passage, and does not restrict the flow of the brake liquid in a state in which said at least one linear solenoid valve is opened.

3. The hydraulic brake system according to claim 2, wherein the flow-passage restricting device comprises:

a restrictor which is provided in series in the pressure-decrease liquid passage; and a liquid-discharge check valve which is connected to the pressure-decrease liquid passage such that the liquid-discharge check valve is in parallel with the restrictor, and which prevents the brake liquid from flowing backward from the suction portion of the pump toward said at least one linear solenoid valve, wherein when a pressure difference across the liquid-discharge check valve exceeds a suction-time pressure difference as a maximum pressure difference across the liquid-discharge check valve at a time when the pump sucks the brake liquid in a state in which a pressure of the brake liquid present in said at least one first fluid chamber of said at least one inner space of said at least one housing that is located, with respect to said at least one valve seat, on the side of said at least one valve member, said at least one plunger and said at least one spring, is equal the atmospheric pressure, the liquid-discharge check valve permits the brake liquid to flow from said at least one linear solenoid valve toward the suction portion of the pump and, when the pressure difference across the liquid-discharge check valve does not exceed the suction-time pressure difference, the liquid-discharge check valve prevents the brake liquid from flowing from said at least one linear solenoid valve toward the suction portion of the pump.

* * * * *